United States Patent
Petersen et al.

(10) Patent No.: US 11,181,464 B2
(45) Date of Patent: Nov. 23, 2021

(54) VARIABLE MULTIPLEXING SWITCHES FOR DETECTOR ARRAYS, SYSTEMS AND METHODS OF USE THEREOF

(71) Applicant: Becton, Dickinson and Company, Franklin Lakes, NJ (US)

(72) Inventors: Timothy Petersen, Seattle, WA (US);
Eric D. Diebold, Menlo Park, CA (US);
Jianying Cao, San Jose, CA (US);
Bernard Johanna Verwer, Los Gatos, CA (US)

(73) Assignee: Becton, Dickinson and Company, Franklin Lakes, NJ (US)

( * ) Notice: Subject to any disclaimer, the term of this patent is extended or adjusted under 35 U.S.C. 154(b) by 25 days.

(21) Appl. No.: 16/422,630

(22) Filed: May 24, 2019

(65) Prior Publication Data
US 2019/0383725 A1 Dec. 19, 2019

Related U.S. Application Data

(60) Provisional application No. 62/687,151, filed on Jun. 19, 2018.

(51) Int. Cl.
*G01N 15/14* (2006.01)
*G01N 15/10* (2006.01)

(52) U.S. Cl.
CPC . *G01N 15/1436* (2013.01); *G01N 2015/1006* (2013.01)

(58) Field of Classification Search
CPC ....... G01N 15/1436; G01N 2015/1006; G01N 15/1429; G01N 2015/149; G01N 15/1459; G01N 15/147; G01N 15/1475; G01N 2015/0065; G01N 2015/144; G01N 21/6456; G01N 2201/06113; G01N 2201/10; G01N 2201/12; G01N 2201/129; G01S 7/4868; G01S 7/4917; G02B 6/3556
See application file for complete search history.

(56) References Cited

U.S. PATENT DOCUMENTS 5,345,326 A * 9/1994 Araki .................. G02B 6/3556
398/45
6,166,850 A * 12/2000 Roberts .............. H01S 3/13013
359/341.2

(Continued)

FOREIGN PATENT DOCUMENTS

WO WO2007011630 A2 1/2007

OTHER PUBLICATIONS https://www.rp-photonics.com/q_switching.html.*

*Primary Examiner* — Mohamed K Amara
(74) *Attorney, Agent, or Firm* — Peter W. Schroen; Bret E. Field; Bozicevic, Field & Francis LLP

(57) ABSTRACT

Systems for differentially detecting light (e.g., in a flow stream) are described. Light detection systems according to certain embodiments include a plurality of photodetectors, an amplifier component and an electronic switch component having a plurality of switches in electrical communication with the plurality of photodetectors and the amplifier component. Systems and methods for differentially detecting light and optimizing the measurement of light emitted by a sample (e.g., in a flow stream) are also described. Kits having a photodetector array, an amplifier component and an electronic switch component are also provided.

20 Claims, 5 Drawing Sheets

(56) References Cited

U.S. PATENT DOCUMENTS

| | | | |
|---|---|---|---|
| 6,483,962 B1* | 11/2002 | Novotny | G02B 6/32 |
| | | | 359/224.1 |
| 6,580,739 B1 | 6/2003 | Coldren et al. | |
| 6,965,103 B2 | 11/2005 | Shapiro et al. | |
| 8,188,418 B1* | 5/2012 | Kondratko | G01S 7/4861 |
| | | | 250/214 LS |
| 9,172,873 B2* | 10/2015 | Yang | H04N 5/3745 |
| 9,280,635 B2 | 3/2016 | Rich | |
| 2002/0009364 A1* | 1/2002 | Otsuka | F04D 29/663 |
| | | | 415/206 |
| 2002/0190221 A1 | 12/2002 | Hutchinson et al. | |
| 2003/0222207 A1* | 12/2003 | Bloehbaum | G01V 8/10 |
| | | | 250/221 |
| 2003/0228087 A1* | 12/2003 | Spivey | G02B 26/0833 |
| | | | 385/16 |
| 2004/0114940 A1* | 6/2004 | Edwards | H04B 10/114 |
| | | | 398/182 |
| 2006/0181627 A1* | 8/2006 | Farrier | H04N 5/35545 |
| | | | 348/308 |
| 2007/0046938 A1* | 3/2007 | Adams | G01N 15/147 |
| | | | 356/343 |
| 2012/0021525 A1* | 1/2012 | Fehr | B01L 3/502707 |
| | | | 436/94 |
| 2014/0113359 A1* | 4/2014 | Dutta | H01L 31/09 |
| | | | 435/288.7 |
| 2014/0273193 A1 | 9/2014 | Li | |
| 2015/0138623 A1* | 5/2015 | Graves | G01B 11/272 |
| | | | 359/290 |
| 2015/0162984 A1* | 6/2015 | Liu | G08C 23/04 |
| | | | 398/115 |
| 2015/0198528 A1* | 7/2015 | Manneh | G01N 21/6408 |
| | | | 506/4 |
| 2015/0215066 A1* | 7/2015 | Testa | H04J 14/06 |
| | | | 398/48 |
| 2016/0105242 A1* | 4/2016 | Wang | H04J 14/02 |
| | | | 398/165 |
| 2016/0178439 A1* | 6/2016 | Freudiger | G01N 15/1434 |
| | | | 356/301 |
| 2017/0307505 A1 | 10/2017 | Vrane et al. | |
| 2017/0307757 A1* | 10/2017 | Hinderling | G01S 7/4818 |
| 2017/0328826 A1* | 11/2017 | Diebold | G01N 15/1429 |
| 2018/0164211 A1* | 6/2018 | Kageyama | G01N 21/39 |
| 2018/0267247 A1* | 9/2018 | Yan | G02B 6/35 |
| 2018/0267250 A1* | 9/2018 | Hosseini | G01S 7/4814 |
| 2018/0275222 A1* | 9/2018 | Jackson | G01R 33/032 |
| 2020/0256995 A1* | 8/2020 | Inoue | G01S 17/32 |

* cited by examiner

VARIABLE MULTIPLEXING SWITCHES FOR DETECTOR ARRAYS, SYSTEMS AND METHODS OF USE THEREOF

CROSS-REFERENCE TO RELATED APPLICATIONS

Pursuant to 35 U.S.C. § 119(e), this application claims priority to the filing date of U.S. Provisional Patent Application Ser. No. 62/687,151 filed Jun. 19, 2018; the disclosure of which application is herein incorporated by reference.

INTRODUCTION

Light detection is often used to characterize components of a sample (e.g., biological samples), for example when the sample is used in the diagnosis of a disease or medical condition. When a sample is irradiated, light can be scattered by the sample, transmitted through the sample as well as emitted by the sample (e.g., by fluorescence). Variations in the sample components, such as morphologies, absorptivity and the presence of fluorescent labels may cause variations in the light that is scattered, transmitted or emitted by the sample. These variations can be used for characterizing and identifying the presence of components in the sample. To quantify these variations, the light is collected and directed to the surface of a detector. The degree to which fluorophore content is determine is often limited, in part, by the fluorescence spectra of multi-fluorophore-containing samples and the spectral overlap between the emitted light.

One technique that utilizes light detection to characterize the components in a sample is flow cytometry. Using data generated from the detected light, distributions of the components can be recorded and where desired material may be sorted. Light from the light source can be detected as scatter or by transmission spectroscopy or can be absorbed by one or more components in the sample and re-emitted as luminescence. Variations in the materials, such as morphologies or fluorescent label, cause variations in the observed light which allow for characterization by collecting the light onto an optical detector.

SUMMARY

Aspects of the present disclosure include light detection systems for differentially detecting light. Systems according to certain embodiments include a plurality of photodetectors, an amplifier component and an electronic switch component having a plurality of switches in electrical communication with the plurality of photodetectors and the amplifier component. In some embodiments, the photodetectors include photodiodes, photomultiplier tubes or a combination thereof. In some instances, the plurality of photodetectors is a photodetector array, such as a photodiode array. In some embodiments, the amplifier component includes a plurality of amplifiers, such as transimpedence amplifiers, summing amplifiers or a combination thereof. The electronic switch component is configured to multiplex or de-multiplex output signals from the photodetectors. In embodiments, the amplifier component may be configured to receive multiplexed or de-multiplexed output signals from the electronic switch component or electronic switch component may be configured to receive multiplex or de-multiplex output signals from the amplifier component. In certain instances, the amplifier component is electrically positioned between the photodetectors (e.g., photodetector array) and the electronic switch component. In other instances, light detection systems include a first amplifier component electrically positioned between the photodetectors and an electronic switch component and a second amplifier component electrically downstream from the electronic switch component. In certain embodiments, the first amplifier component includes a plurality of transimpedence amplifiers and the second amplifier component includes a plurality of summing amplifiers.

In some embodiments, light detection systems of interest include a photodetector array having N photodetectors, an amplifier component having 2N amplifiers and an electronic switch component having an array of N×N switches, where N is an integer from 4 to 1000. In some instances, the photodetector array may be a photodiode array having N photodiodes. The amplifier component in these embodiments may include N transimpedence amplifiers, N summing amplifiers or a combination thereof. In some embodiments, N is 4. In other embodiments, N is 8.

Aspects of the present disclosure also include a flow cytometer having a light detection system for differentially detecting light. Flow cytometers according to certain embodiments include a light source for irradiating a sample in a flow stream, a light dispersion component configured to disperse a spectrum of light from the sample and a light detection system having a plurality of photodetectors, an amplifier component and an electronic switch component having a plurality of switches in electrical communication with the plurality of photodetectors and the amplifier component. In embodiments, the light dispersion component is configured to project a spectrum of light from the sample onto the plurality of photodetectors, such as projecting a spectrum of light from the sample across a photodetector array (e.g., photodiode array). In certain embodiments, the light dispersion component includes a diffraction grating. In some instances, the light detection system is configured to differentially detect different wavelengths of light from the sample by deactivating a subset of switches in the electronic switch component. In other instances, the light detection system is configured to detect one or more predetermined sets of wavelengths of light from the sample, such as where each set of wavelengths of light include 50 different wavelengths or less, such as 25 different wavelengths of less.

Aspect of the disclosure also include methods for irradiating a sample (e.g., in a flow stream) in an interrogation field with a light source, collecting and detecting light from the sample with the subject light detection systems and measuring the detected light at one or more wavelengths. In some embodiments, methods include identifying or characterizing one or more components of the sample, such as identifying one or more different types of cell populations in the sample.

Aspects of the present disclosure also include methods and computer-controlled systems for optimizing the characterization of fluorescence from a sample having a plurality of fluorophores (e.g., two or more different fluorophores). In embodiments, fluorophores of interest have emission spectra which exhibit overlap. In these embodiments, methods in certain instances include differentially detecting light with a plurality of photodetectors having one or more optical bandpass filters. In other instances, methods include differentially detecting light with an optoelectronic bandpass filter, such as a light detection summarized above.

Methods for optimizing the characterization of fluorescence from a sample having a plurality of fluorophores according to certain embodiments include determining a cost function for a bandpass filter by detecting light emitted from a plurality of fluorophores with two or more photodetectors having a bandpass filter, determining a spillover matrix for the fluorescence spectra of the plurality of fluorophores and calculating a cost function for detecting the light with the bandpass filter based on the spillover matrix. In embodiments, the spillover matrix includes M×N spillover coefficients, where M is the number of photodetectors used to detect light from the plurality of fluorophores and N is the number of fluorophores. In some instances, calculating the cost function includes determining an uncertainty factor associated with each fluorophore. Determining the uncertainty factor may include regression analysis such as linear regression or may include using an ordinary least squares solution. The uncertainty factor is, in some embodiments, added in quadrature. In certain embodiments, the cost function is calculated according to equation I:

$$\text{Cost Function} = \sum_{i=1}^{n} (dF_i)^2$$

where n is the number of fluorophores; and dF is the determined uncertainty associated with each fluorophore. Methods for determining a cost function for a bandpass filter (e.g., a set of bandpass filters) may also include determining the fluorescence spectra of each fluorophore in the sample. In certain instance, methods further include assigning a number of photoelectrons to each fluorophore and determining how the photoelectrons will be divided between the one or more photodetectors based on the spillover matrix.

One or more bandpass filters may be determined to provide for optimal the characterization of fluorescence from a sample having a plurality of fluorophores by a genetic algorithm based on a calculated cost function. In embodiments, methods include identifying a population of different bandpass filters for use in detecting light emitted from a plurality of fluorophores with two or more photodetectors; calculating a cost function for each bandpass filter using a spillover matrix that comprises spillover coefficients determined from fluorescence spectra of the plurality of fluorophores; and determining an optimal bandpass filter for detecting light from a sample comprising the plurality of fluorophores with the two or more photodetectors based on the calculated cost function. The genetic algorithm according to certain embodiments include mutating one or more of the bandpass filters in the identified population to produce a mutated population of bandpass filters, wherein the mutated population comprises bandpass filters having wavelengths that are shifted as compared to the bandpass filters of the identified population; and calculating a cost function for each bandpass filter of the mutated population. The mutated population may include bandpass filters having wavelengths that are bathochromically or hypsochromically shifted as compared to the bandpass filters of the identified population. Methods also include mating two or more different bandpass filters from the identified population and the mutated population to produce an offspring population of bandpass filters, wherein each offspring bandpass filter comprises wavelengths randomly selected from the mated bandpass filters; and calculating a cost function for each bandpass filter of the offspring population. Based on the cost functions of each identified bandpass filter combination, methods include comparing the calculated cost function for each bandpass filter in the identified population, mutated population and offspring population; and determining an optimal set of bandpass filters for detecting light from a sample comprising the plurality of fluorophores. Methods, in certain instances, may include ranking the bandpass filters based on calculated cost function. In some embodiments, the optimal set of bandpass filters for characterizing a sample having a plurality of fluorophores is determined by determining the set of bandpass filters having a median cost function and discarding the bandpass filter combinations having a cost function below the median.

Computer-controlled systems for calculating cost function and determining a set of bandpass filters for optimizing, based on a calculated cost function, the characterization of fluorescence from a sample having a plurality of fluorophores with a genetic algorithm are also provided. Systems for calculating a cost function according to certain embodiments include a plurality of photodetectors having a bandpass filter for detecting light emitted from a plurality of fluorophores; and a processor comprising memory operably coupled to the processor where the memory includes instructions stored thereon, which when executed by the processor, cause the processor to: determine a spillover matrix for the fluorescence spectra of the plurality of fluorophores; and calculate a cost function for detecting the light with the bandpass filter based on the spillover matrix. In some embodiments, the memory further includes instructions, which when executed by the processor, cause the processor to determine an uncertainty factor associated with each fluorophore, such as by regression analysis, linear regression or an ordinary least squares solution. In some embodiments, the memory includes instructions, which when executed by the processor, cause the processor to add the uncertainty factors associated with the plurality of fluorophores in quadrature. In certain embodiments, the memory includes instructions which when executed by the processor, cause the processor to calculate the uncertainty factor according equation I:

$$\text{Cost Function} = \sum_{i=1}^{n} (dF_i)^2$$

where n is the number of fluorophores; and dF is the determined uncertainty associated with each fluorophore.

Systems may also include a processor having memory operably coupled to the processor where the memory includes instructions stored thereon, which when executed by the processor, cause the processor to: identify a population of different bandpass filters for use in detecting light emitted from the plurality of fluorophores; calculate a cost function for each bandpass filter using a spillover matrix that includes spillover coefficients determined from fluorescence spectra of the plurality of fluorophores; and determine an optimal bandpass filter for detecting light from a sample having the plurality of fluorophores with the photodetectors based on the calculated cost function. In some embodiments, the memory further includes instructions, which when executed by the processor, cause the processor to: mutate one or more of the bandpass filters in the identified population to produce a mutated population of bandpass filters, where the mutated population comprises bandpass filters having wavelengths that are shifted as compared to the bandpass filters of the identified population; and calculate a cost function for each bandpass filter of the mutated population. In some embodiments, the mutated population includes bandpass filters having wavelengths that are bathochromically shifted as compared to the bandpass filters of the identified population. In other embodiments, the mutated population includes bandpass filters having wavelengths that are hypsochromically shifted as compared to the bandpass filters of the identified population. In one example, the mutated population may include bandpass filters having wavelengths that are shifted by 1 nm or more as compared to the bandpass filters of the identified population. In another example, the mutated population may include bandpass filters having wavelengths that are shifted by 1% or more as compared to the bandpass filters of the identified population. In embodiments, the memory may further comprises instructions, which when executed by the processor, cause the processor to: mate two or more different bandpass filters from the identified population and the mutated population to produce an offspring population of bandpass filters, where each offspring bandpass filter has wavelengths randomly selected from the mated bandpass filters; and calculate a cost function for each bandpass filter of the offspring population. In some embodiments, systems may also include a processor having memory operably coupled to the processor where the memory includes instructions stored thereon, which when executed by the processor, cause the processor to compare the calculated cost function for each bandpass filter in the identified population, mutated population and offspring population; and determine an optimal set of bandpass filters for detecting light from a sample that includes the plurality of fluorophores. The memory, in some instances, includes instructions, which when executed by the processor, cause the processor to rank the bandpass filters based on calculated cost function. Systems of interest may also include memory that includes instructions, which when executed by the processor, cause the processor to determine the set of bandpass filters having a median cost function and to to discard the bandpass filters having a cost function below the median.

Kits including one or more components of the subject light detection systems are also provided. Kits according to certain embodiments, include a photodetector array; an amplifier component having a plurality of amplifiers; and an electronic switch component having a plurality of switches, where the electronic switch component is configured to be electrically coupled to the plurality of photodetectors and the plurality of amplifiers. In embodiments, kits may also include an optical adjustment component a light dispersion component, such as a diffraction grating as well as a flow cell for propagating a sample in a flow stream.

BRIEF DESCRIPTION OF THE FIGURES

The invention may be best understood from the following detailed description when read in conjunction with the accompanying drawings. Included in the drawings are the following figures.

DETAILED DESCRIPTION

Figure 1:
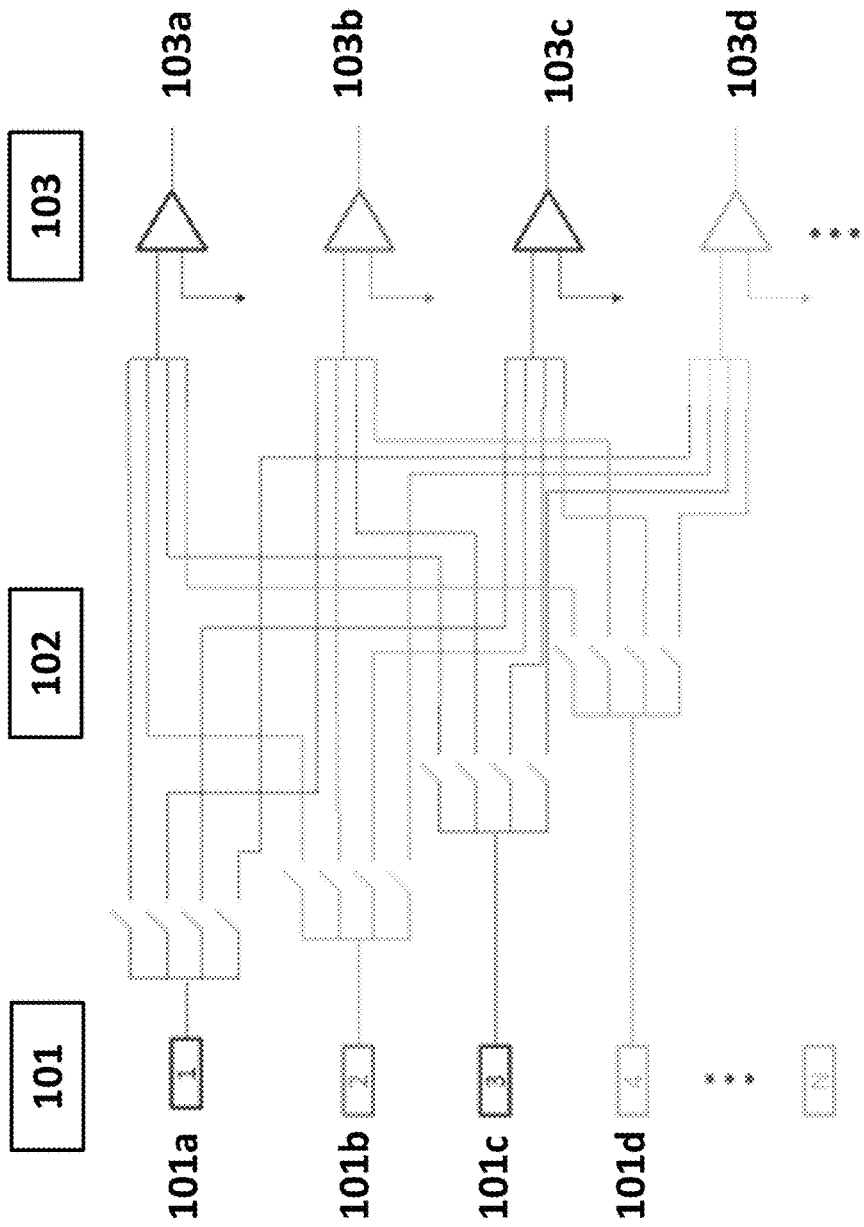
FIG. 1 depicts an illustration of a light detection system having a photodetector component, an electronic switch component and an amplifier component according to certain embodiments.

Systems for differentially detecting light (e.g., in a flow stream) are described. Light detection systems according to certain embodiments include a plurality of photodetectors, an amplifier component and an electronic switch component having a plurality of switches in electrical communication with the plurality of photodetectors and the amplifier component. Systems and methods for differentially detecting light and optimizing the measurement of light emitted by a sample (e.g., in a flow stream) are also described. Kits having a photodetector array, an amplifier component and an electronic switch component are also provided.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

While the apparatus and method has or will be described for the sake of grammatical fluidity with functional explanations, it is to be expressly understood that the claims, unless expressly formulated under 35 U.S.C. § 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 U.S.C. § 112 are to be accorded full statutory equivalents under 35 U.S.C. § 112.

As summarized above, the present disclosure provides light detection systems having a plurality of photodetectors, an amplifier component and an electronic switch component. In further describing embodiments of the disclosure, light detection systems in accordance with embodiments of the invention are described first in greater detail. Next, systems (e.g., flow cytometers) and methods for measuring light emitted by a sample (e.g., in a flow stream) and kits having a photodetector array, an amplifier component and an electronic switch are described. Methods and systems for selecting one or more bandpass filters to detect light from a sample having a plurality of fluorophores are also provided.

Light Detections Systems

Aspects of the present disclosure include light detection systems configured for detecting light emitted by a sample (e.g., in a flow stream of a flow cytometer). In some embodiments, the sample includes a plurality of light emitting compounds (e.g., fluorophores) and the subject systems are configured to dynamically distinguish light emanating from the sample flowing through the flow cell. For instance, the light detection system may be configured to distinguish light emanating from different fluorophore populations or different particle populations in the sample, such as to distinguish between different cell populations in the sample. In some embodiments, the light detection system is configured to dynamically detect different wavelengths of light emanating from different fluorophores in a sample.

Light detection systems according to certain embodiments provide for differential obscuration of specific wavelengths of light. By "differential obscuration" is meant that one or more wavelengths of light emanating from the sample is obscured, such as by: 1) not detecting the light with the photodetector; or 2) not generating an electronic signal in response to detection of the light. In some embodiments, the subject systems are configured to provide for differential obscuration of 1 or more different wavelengths of light emanating from the sample, such as 2 or more different wavelengths, such as 3 or more different wavelengths, such as 4 or more different wavelengths, such as 5 or more different wavelengths, such as 10 or more different wavelengths, such as 15 or more different wavelengths, such as 25 or more different wavelengths, such as 50 or more different wavelengths, such as 100 or more different wavelengths, such as 150 or more different wavelengths, such as 250 or more different wavelengths and including 500 or more different wavelengths of light emanating from a sample. In other embodiments, the subject systems are configured to provide for differential obscuration of a range of wavelengths, such a range of 5 nm or more, such as 10 nm or more, such as 15 nm or more, such as 25 nm or more, such as 50 nm or more, such as 75 nm or more, such as 100 nm or more, such as 150 nm or more, such as 200 nm or more, such as 250 nm or more and including 300 nm or more. For instance, systems of interest may be configured to provide for differential obscuration of a range of wavelengths of from 2 nm to 500 nm, such as from 3 nm to 450 nm, such as from 4 nm to 400 nm, such as from 5 nm to 350 nm, such as from 10 nm to 300 nm, such as from 15 nm to 250 nm and including from 20 nm to 200 nm. In yet other embodiments, the subject systems are configured to provide for differential obscuration of wavelengths above or below a predetermined wavelength threshold. In one example, wavelengths of light above 800 nm emanating from a sample may be differentially obscured. In another example, wavelengths of light below 400 nm emanating from a sample may be differentially obscured. In certain instances, the subject systems are configured to operate as a combination of one or more bandpass filters where particular wavelengths, as desired, are differentially obscured. Systems may be configured to obscure any desired number of wavelengths such that 2 or more different wavelengths may be detected by the plurality of photodetectors and an electronic signal is generated in response to the detected light, such as 3 or more different wavelengths, such as 5 or more different wavelengths, such as 10 or more different wavelengths, such as 15 or more different wavelengths, such as 25 or more different wavelengths and including 50 or more different wavelengths.

In embodiments, light detection systems include a plurality of photodetectors, an amplifier component and an electronic switch component having a plurality of switches in electrical communication with the plurality of photodetectors and the amplifier component. Photodetectors of interest may include, but are not limited to optical sensors, such as active-pixel sensors (APSs), avalanche photodiode, image sensors, charge-coupled devices (CCDs), intensified charge-coupled devices (ICCDs), light emitting diodes, photon counters, bolometers, pyroelectric detectors, photoresistors, photovoltaic cells, photodiodes, photomultiplier tubes, phototransistors, quantum dot photoconductors or photodiodes and combinations thereof, among other photodetectors. In certain embodiments, light from a sample is measured with a charge-coupled device (CCD), semiconductor charge-coupled devices (CCD), active pixel sensors (APS), complementary metal-oxide semiconductor (CMOS) image sensors or N-type metal-oxide semiconductor (NMOS) image sensors.

In some embodiments, light detection systems of interest include a plurality of photodetectors. In some instances, the light detection system includes a plurality of solid-state detectors such as photodiodes. In certain instances, the light detection system includes a photodetector array, such as an array of photodiodes. In these embodiments, the photodetector array may include 4 or more photodetectors, such as 10 or more photodetectors, such as 25 or more photodetectors, such as 50 or more photodetectors, such as 100 or more photodetectors, such as 250 or more photodetectors, such as 500 or more photodetectors, such as 750 or more photodetectors and including 1000 or more photodetectors. For example, the detector may be a photodiode array having 4 or more photodiodes, such as 10 or more photodiodes, such as 25 or more photodiodes, such as 50 or more photodiodes, such as 100 or more photodiodes, such as 250 or more photodiodes, such as 500 or more photodiodes, such as 750 or more photodiodes and including 1000 or more photodiodes.

The photodetectors may be arranged in any geometric configuration as desired, where arrangements of interest include, but are not limited to a square configuration, rectangular configuration, trapezoidal configuration, triangular configuration, hexagonal configuration, heptagonal configuration, octagonal configuration, nonagonal configuration, decagonal configuration, dodecagonal configuration, circular configuration, oval configuration as well as irregular patterned configurations. The photodetectors in the photodetector array may be oriented with respect to the other (as referenced in an X-Z plane) at an angle ranging from 10° to 180°, such as from 15° to 170°, such as from 20° to 160°, such as from 25° to 150°, such as from 30° to 120° and including from 45° to 90°. The photodetector array may be any suitable shape and may be a rectilinear shape, e.g., squares, rectangles, trapezoids, triangles, hexagons, etc., curvilinear shapes, e.g., circles, ovals, as well as irregular shapes, e.g., a parabolic bottom portion coupled to a planar top portion. In certain embodiments, the photodetector array has a rectangular-shaped active surface.

Each photodetector (e.g., photodiode) in the array may have an active surface with a width that ranges from 5 µm to 250 µm, such as from 10 µm to 225 µm, such as from 15 µm to 200 µm, such as from 20 µm to 175 µm, such as from 25 µm to 150 µm, such as from 30 µm to 125 µm and including from 50 µm to 100 µm and a length that ranges from 5 µm to 250 µm, such as from 10 µm to 225 µm, such as from 15 µm to 200 µm, such as from 20 µm to 175 µm, such as from 25 µm to 150 µm, such as from 30 µm to 125 µm and including from 50 µm to 100 µm, where the surface area of each photodetector (e.g., photodiode) in the array ranges from 25 to $\mu m^2$ to 10000 $\mu m^2$, such as from 50 to $\mu m^2$ to 9000 $\mu m^2$, such as from 75 to $\mu m^2$ to 8000 $\mu m^2$, such as from 100 to $\mu m^2$ to 7000 $\mu m^2$, such as from 150 to $\mu m^2$ to 6000 $\mu m^2$ and including from 200 to $\mu m^2$ to 5000 $\mu m^2$.

The size of the photodetector array may vary depending on the amount and intensity of the light, the number of photodetectors and the desired sensitivity and may have a length that ranges from 0.01 mm to 100 mm, such as from 0.05 mm to 90 mm, such as from 0.1 mm to 80 mm, such as from 0.5 mm to 70 mm, such as from 1 mm to 60 mm, such as from 2 mm to 50 mm, such as from 3 mm to 40 mm, such as from 4 mm to 30 mm and including from 5 mm to 25 mm. The width of the photodetector array may also vary, ranging from 0.01 mm to 100 mm, such as from 0.05 mm to 90 mm, such as from 0.1 mm to 80 mm, such as from 0.5 mm to 70 mm, such as from 1 mm to 60 mm, such as from 2 mm to 50 mm, such as from 3 mm to 40 mm, such as from 4 mm to 30 mm and including from 5 mm to 25 mm. As such, the active surface of the photodetector array may range from 0.1 $mm^2$ to 10000 $mm^2$, such as from 0.5 $mm^2$ to 5000 $mm^2$, such as from 1 $mm^2$ to 1000 $mm^2$, such as from 5 $mm^2$ to 500 $mm^2$, and including from 10 $mm^2$ to 100 $mm^2$.

Photodetectors of interest are configured to measure collected light at one or more wavelengths, such as at 2 or more wavelengths, such as at 5 or more different wavelengths, such as at 10 or more different wavelengths, such as at 25 or more different wavelengths, such as at 50 or more different wavelengths, such as at 100 or more different wavelengths, such as at 200 or more different wavelengths, such as at 300 or more different wavelengths and including measuring light emitted by a sample in the flow stream at 400 or more different wavelengths.

In some embodiments, photodetectors are configured to measure collected light over a range of wavelengths (e.g., 200 nm-1000 nm). In certain embodiments, photodetectors of interest are configured to collect spectra of light over a range of wavelengths. For example, systems may include one or more detectors configured to collect spectra of light over one or more of the wavelength ranges of 200 nm-1000 nm. In yet other embodiments, detectors of interest are configured to measure light from the sample in the flow stream at one or more specific wavelengths. For example, systems may include one or more detectors configured to measure light at one or more of 450 nm, 518 nm, 519 nm, 561 nm, 578 nm, 605 nm, 607 nm, 625 nm, 650 nm, 660 nm, 667 nm, 670 nm, 668 nm, 695 nm, 710 nm, 723 nm, 780 nm, 785 nm, 647 nm, 617 nm and any combinations thereof. In certain embodiments, photodetectors may be configured to be paired with specific fluorophores, such as those used with the sample in a fluorescence assay.

The light detection system is configured to measure light continuously or in discrete intervals. In some instances, photodetectors of interest are configured to take measurements of the collected light continuously. In other instances, the light detection system is configured to take measurements in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval.

As summarized above, light detection systems also include an amplifier component. In embodiments, the amplifier component is configured to amplify output signals from the photodetectors in response to detected light. In some embodiments, the amplifier component includes a current-to-voltage converter, such as a transimpedance amplifier. In other embodiments, the amplifier component includes an operational amplifier circuit, such as a summing amplifier. In embodiments, output currents from the photodetectors are converted to voltages and in certain instances, combined with summing amplifiers and propagated to a processor for outputting a data signal.

Depending on the number of photodetectors employed in the light detection system, the amplifier component may include 2 or more amplifiers, such as 3 or more amplifiers, such as 4 or more amplifiers, such as 5 or more amplifiers, such as 6 or more amplifiers, such as 7 or more amplifiers, such as 8 or more amplifiers, such as 9 or more amplifiers, such as 10 or more amplifiers, such as 15 or more amplifiers, such as 25 or more amplifiers, such as 50 or more amplifiers, such as 100 or more amplifiers, such as 250 or more amplifiers, such as 500 or more amplifiers, such as 750 or more amplifiers and including 1000 or more amplifiers. In certain embodiments, the amplifier component includes 2 or more transimpedence amplifiers, such as 3 or more transimpedence amplifiers, such as 4 or more transimpedence amplifiers, such as 5 or more transimpedence amplifiers, such as 6 or more transimpedence amplifiers, such as 7 or more transimpedence amplifiers, such as 8 or more transimpedence amplifiers, such as 9 or more transimpedence amplifiers, such as 10 or more transimpedence amplifiers, such as 15 or more transimpedence amplifiers, such as 25 or more transimpedence amplifiers, such as 50 or more transimpedence amplifiers, such as 100 or more transimpedence amplifiers, such as 250 or more transimpedence amplifiers, such as 500 or more transimpedence amplifiers, such as 750 or more transimpedence amplifiers and including 1000 or more transimpedence amplifiers. In other embodiments, the amplifier component includes 2 or more summing amplifiers, such as 3 or more summing amplifiers, such as 4 or more summing amplifiers, such as 5 or more summing amplifiers, such as 6 or more summing amplifiers, such as 7 or more summing amplifiers, such as 8 or more summing amplifiers, such as 9 or more summing amplifiers, such as 10 or more summing amplifiers, such as 15 or more summing amplifiers, such as 25 or more summing amplifiers, such as 50 or more summing amplifiers, such as 100 or more summing amplifiers, such as 250 or more summing amplifiers, such as 500 or more summing amplifiers, such as 750 or more summing amplifiers and including 1000 or more summing amplifiers.

In some embodiments, the light detection system includes a number of amplifiers that is equal to the number of photodetectors. For example, light detection systems may include N photodetectors and N amplifiers, such as where N is an integer from 2 to 1024, such as where N is from 4 to 512, such as where N is from 8 to 256 and including where N is from 16 to 128. In certain instances, N is 4 (i.e., the light detection system includes 4 photodetectors and 4 amplifiers). In other instances, N is 8. In yet other instances, N is 16. In still other instances, N is 32. In other embodiments, light detection systems include N photodetectors and 2N amplifiers, such as where N is an integer from 2 to 1024, such as where N is from 4 to 512, such as where N is from 8 to 256 and including where N is from 16 to 128. For example, the light detection system may include a transimpedence amplifier and a summing amplifier for each photodetector.

The amplifier component (e.g., transimpedence amplifiers) is in electrical communication with the plurality of photodetectors and electronic switch component. In some embodiments, the amplifier component is in direct electrical communication (i.e., immediately downstream) with the plurality of photodetectors. In other embodiments, the amplifier component is in electrical communication with the plurality of photodetectors through the electronic switch component. In certain embodiments, light detection systems of interest include a first amplifier component electrically positioned between the photodetectors and an electronic switch component and a second amplifier component electrically downstream from the electronic switch component. In some instances, the first amplifier component includes a plurality of transimpedence amplifiers configured to receive output signals from the photodetectors and the second amplifier component includes a plurality of summing amplifiers configured to receive output signals from the electronic switch component.

The amplifier component is in electrical communication with an electronic switch component and each amplifier in the amplifier component can be configured to receive electronic signal from one or more of the photodetectors. For example, where the photodetector component includes N photodetectors, each amplifier in the amplifier component may be configured to receive a signal from N photodetectors or some fraction thereof, such as N/2 photodetectors, N/4 photodetectors, N/8 photodetectors, N/16 photodetectors, N/32 photodetectors or some other fraction. In one example, the light detection system includes 64 photodetectors and each amplifier is configured to receive a signal all 64 different photodetectors (i.e., configured to receive a signal from N photodetectors). In another example, the light detection system includes 64 photodetectors and each amplifier is configured to receive a signal from 32 different photodetectors (i.e., configured to receive a signal from N/2 photodetectors). In still another example, the light detection system includes 64 photodetectors and each amplifier is configured to receive a signal from 16 different photodetectors (i.e., configured to receive a signal from N/4 photodetectors). In these embodiments, the electronic switch component can multiplex or de-multiplex electronic signal from the photodetector and convey the multiplexed or de-multiplexed electronic signal from the photodetectors.

As summarized above, the subject light detection systems include an electronic switch component having a plurality of switches in electrical communication with the plurality of photodetectors and the amplifier component. In some embodiments, the electronic switch component is configured to modulate the propagation of signals from the plurality of photodetectors to the amplifier component. In other embodiments, signals from the photodetectors are propagated directly to the amplifier component (e.g., a plurality of transimpedence amplifiers) and the electronic switch component is configured to modulate the propagation of amplified signal from each of the amplifiers. As such, the subject light detection systems can be configured to modulate, with the electronic switch component, raw signals from the photodetectors or amplified signals from the amplifier component. Any convenient electronic switch protocol can be employed that is capable of interrupting and diverting a current in a circuit and may include, but is not limited to, bipolar transistors, power diodes, metal oxide semiconductor field effect transistors (MOSFET), insulated gate bipolar transistor (IGBT), silicon controlled rectifier (SCR), TRIode AC (TRIAC), Diode AC (DIAC) and gate turn-off thyristor among other types of electronic switches and combinations thereof.

In some embodiments, the electronic switch component is configured to receive signals from the plurality of photodetectors. In some embodiments, the electronic switch component is configured to differentially propagate the signals from the photodetectors to the amplifier component, such that one or more wavelengths of light detected by the photodetectors can be obscured. For example, signals from one or more of the photodetectors can be obscured, such as signals from 2 or more of the photodetectors, such as signals from 3 or more of the photodetectors, such as signals from 3 or more of the photodetectors, such as signals from 4 or more of the photodetectors, such as signals from 8 or more of the photodetectors, such as signals from 16 or more of the photodetectors, such as signals from 32 or more of the photodetectors and including signals from 32 or more of the photodetectors. In these embodiments, one or more wavelengths of light can be obscured, such as 2 or more wavelengths of light, such as 3 or more wavelengths of light, such as 4 or more wavelengths of light, such as 5 or more wavelengths of light, such as 10 or more wavelengths of light, such as 25 or more wavelengths of light, such as 50 or more wavelengths of light, such as 100 or more wavelengths of light and including 250 or more wavelengths of light. In certain embodiments, the electronic switch component is configured to differentially propagate the signals from the photodetectors to the amplifier component, such that one or more wavelength ranges detected by the photodetectors can be obscured, such as 2 or more wavelength ranges, such as 3 or more wavelength ranges, such as 3 or more wavelength ranges, such as 4 or more wavelength ranges, such as 5 or more wavelength ranges, such as 10 or more wavelength ranges and including 25 or more wavelength ranges.

In certain embodiments, the electronic switch component can be configured to obscure predetermined wavelengths or wavelength ranges such that a specific portion of the spectral profile of light from a sample can be differentially detected, such as where particular wavelengths in the range of 200 nm to 1000 nm can be differentially detected. For example, the electronic switch component can be configured to obscure a specific portion of the spectral profile of light from a sample, such as to measure and generate light detection signals at one or more of 450 nm, 518 nm, 519 nm, 561 nm, 578 nm, 605 nm, 607 nm, 625 nm, 650 nm, 660 nm, 667 nm, 670 nm, 668 nm, 695 nm, 710 nm, 723 nm, 780 nm, 785 nm, 647 nm, 617 nm and any combinations thereof.

In other embodiments, the electronic switch component is configured to receive signals from the amplifier component. In certain instances, the signals from the amplifier component are signals which are directly propagated to the amplifier component from the photodetectors. In some embodiments, the electronic switch component is configured to differentially propagate the amplified signals from the amplifier component (e.g., having a plurality of transimpedence amplifiers) to a second amplifier component (e.g., having a plurality of summing amplifiers), such that one or more wavelengths of light detected by the photodetectors can be obscured. For example, amplified signals from one or more of the photodetectors can be obscured, such as amplified signals from 2 or more of the photodetectors, such as signals from 3 or more of the photodetectors, such as signals from 4 or more of the photodetectors, such as amplified signals from 6 or more of the photodetectors, such as amplified signals from 8 or more of the photodetectors, such as amplified signals from 16 or more of the photodetectors, such as amplified signals from 32 or more of the photodetectors and including amplified signals from 64 or more of the photodetectors. In these embodiments, one or more wavelengths of light can be obscured, such as 2 or more wavelengths of light, such as 3 or more wavelengths of light, such as 4 or more wavelengths of light, such as 5 or more wavelengths of light, such as 10 or more wavelengths of light, such as 25 or more wavelengths of light, such as 50 or more wavelengths of light, such as 100 or more wavelengths of light and including 250 or more wavelengths of light. In certain embodiments, the electronic switch component is configured to differentially propagate the amplified signals from the first amplifier component to a second amplifier component, such that one or more wavelength ranges detected by the photodetectors can be obscured, such as 2 or more wavelength ranges, such as 3 or more wavelength ranges, such as 3 or more wavelength ranges, such as 4 or more wavelength ranges, such as 5 or more wavelength ranges, such as 10 or more wavelength ranges and including 25 or more wavelength ranges. In certain embodiments, the electronic switch component can be configured to differentially propagate amplified signals from the first amplifier component (e.g., having a plurality of transimpedence amplifiers) to a second amplifier component (e.g., having a plurality of summing amplifiers) to obscure predetermined wavelengths or wavelength ranges such that a specific portion of the spectral profile of light from a sample can be differentially detected, for example where particular wavelengths in the range of 200 nm to 1000 nm can be differentially detected.

Depending on the number of photodetector and amplifiers (as described above) employed in the light detection system, the electronic switch component may include 2 or more electronic switches, such as 3 or more electronic switches, such as 4 or more electronic switches, such as 5 or more electronic switches, such as 6 or more electronic switches, such as 7 or more electronic switches, such as 8 or more electronic switches, such as 9 or more electronic switches, such as 10 or more electronic switches, such as 15 or more electronic switches, such as 25 or more electronic switches, such as 50 or more electronic switches, such as 100 or more electronic switches, such as 250 or more electronic switches, such as 500 or more electronic switches, such as 750 or more electronic switches and including 1000 or more electronic switches.

In some embodiments, the light detection system includes a number of electronic switches that is equal to the number of photodetectors. For example, light detection systems may include N photodetectors and N electronic switches, such as where N is an integer from 2 to 1024, such as where N is from 4 to 512, such as where N is from 8 to 256 and including where N is from 16 to 128. In certain instances, N is 4 (i.e., the light detection system includes 4 photodetectors and 4 electronic switches). In other instances, N is 8. In yet other instances, N is 16. In still other instances, N is 32. In other embodiments, light detection systems include N photodetectors and 2N electronic switches, such as where N is an integer from 2 to 1024, such as where N is from 4 to 512, such as where N is from 8 to 256 and including where N is from 16 to 128. In some embodiments, the light detection system includes an array of electronic switches. For example, light detection systems which include N photodetectors and N amplifiers may include an N×N array of electronic switches, such as where N is an integer from 2 to 1024, such as where N is from 4 to 512, such as where N is from 8 to 256 and including where N is from 16 to 128. In certain instances, N is 4.

FIG. 1 depicts an illustration of a light detection system having a photodetector component, an electronic switch component and an amplifier component according to certain embodiments. Light detection system 100 includes a photodetector component 101 having a plurality of photodetectors 101a, 101b, 101c, 101d (up to N photodetectors), an electronic switch component 102 having and N×N array of electronic switches in electrical communication with the photodetectors and an amplifier component 103 having a plurality of amplifiers 103a, 103b, 103c, 103d (e.g., transimpedence amplifiers, up to N amplifiers). Signal from each of the photodetectors are in electrical communication with the amplifiers through the electronic switch array. Light from each of the photodetectors can be differentially obscured by modulating the propagation of signal from the photodetectors to the amplifiers through the electronic switches.

Figure 2:
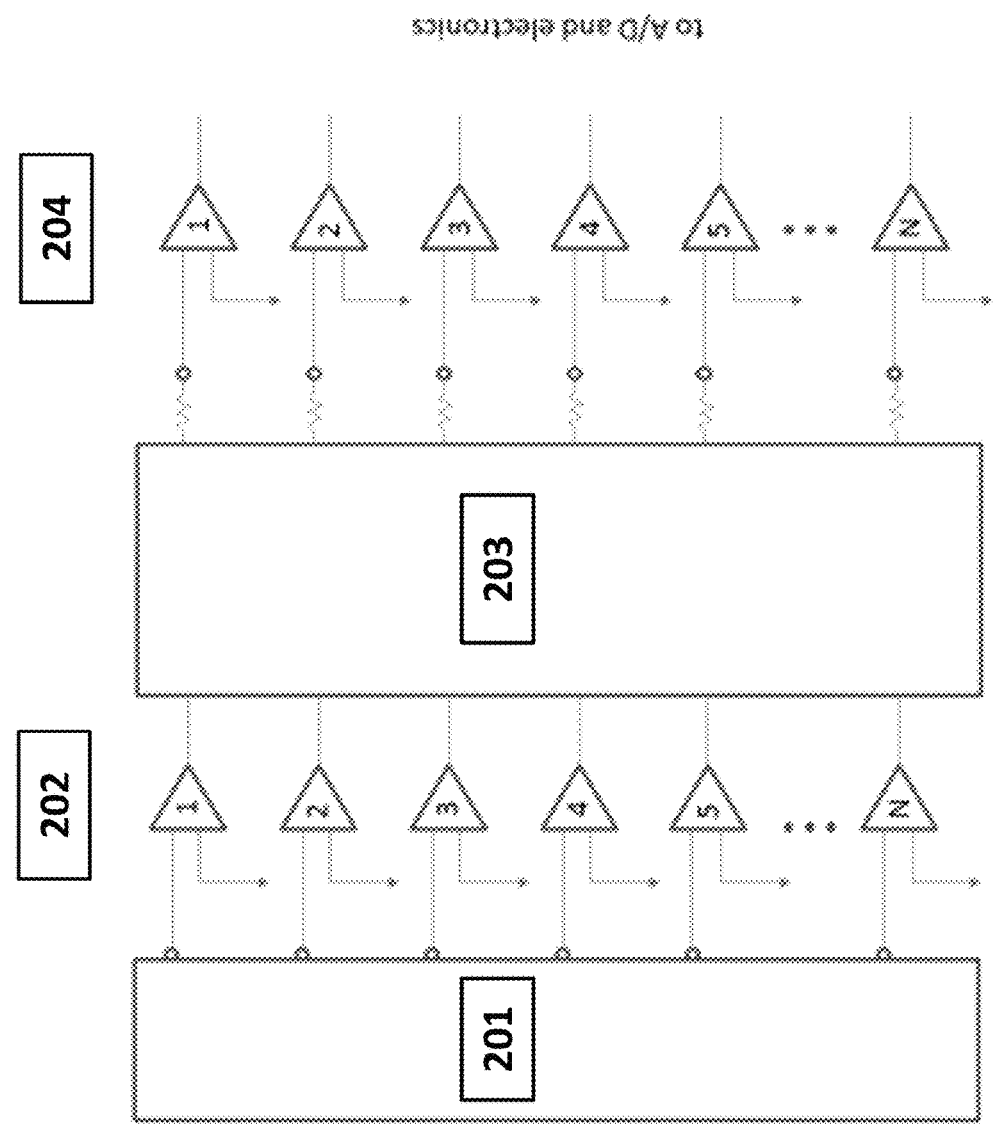
FIG. 2 depicts an illustration of a light detection system having a photodetector component, a first amplifier component, an electronic switch component and a second amplifier component according to certain embodiments.

FIG. 2 depicts an illustration of a light detection system having a photodetector component, a first amplifier component, an electronic switch component and a second amplifier component according to certain embodiments. Light detection system 200 includes photodetector array 201 having N photodetectors, a first amplifier component 202 having N amplifiers (e.g., transimpedence amplifiers), an electronic switch component 203 having N×N electronic switches and a second amplifier component having N amplifiers (e.g., summing amplifiers). Signal from each of the photodetectors in this embodiment are amplified by the plurality of amplifiers of the first amplifier component and differentially propagated to the amplifiers of the second amplifier component with electronic switches. Different wavelengths of light detected by the photodetectors can be differentially obscured by modulating the amplified signals with the electronic switches.

Systems for Detecting Light from a Sample in a Flow Stream

Aspects of the present disclosure include systems configured for measuring light from a sample (e.g., in a flow stream in a flow cytometer). In certain embodiments, systems include a light source, a light dispersion component configured to disperse a spectrum of light from the sample and a light detection system having a plurality of photodetectors, an amplifier component and an electronic switch component, as described above. In some instances, the system is a flow cytometer. In certain embodiments, the light detection system having a plurality of photodetectors, an amplifier component and an electronic switch component is non-releasably integrated into the flow cytometer. In certain embodiments, the light detection system is in optical communication with the source of sample (e.g., the flow stream in a flow cytometer) through an optical collection system (e.g., fiber optics or free-space light relay system).

Systems of interest for measuring light from a sample include a light source. In embodiments, the light source may be any suitable broadband or narrow band source of light. Depending on the components in the sample (e.g., cells, beads, non-cellular particles, etc.), the light source may be configured to emit wavelengths of light that vary, ranging from 200 nm to 1500 nm, such as from 250 nm to 1250 nm, such as from 300 nm to 1000 nm, such as from 350 nm to 900 nm and including from 400 nm to 800 nm. For example, the light source may include a broadband light source emitting light having wavelengths from 200 nm to 900 nm. In other instances, the light source includes a narrow band light source emitting a wavelength ranging from 200 nm to 900 nm. For example, the light source may be a narrow band LED (1 nm-25 nm) emitting light having a wavelength ranging between 200 nm to 900 nm. In some embodiments, the light source is a laser, such as continuous wave laser. For example, the laser may be a helium-neon (HeNe) laser. In certain embodiments, the light source is a laser in a flow cytometer.

In other embodiments, the light source is a non-laser light source, such as a lamp, including but not limited to a halogen lamp, deuterium arc lamp, xenon arc lamp, a light-emitting diode, such as a broadband LED with continuous spectrum, superluminescent emitting diode, semiconductor light emitting diode, wide spectrum LED white light source, an multi-LED integrated. In some instances the non-laser light source is a stabilized fiber-coupled broadband light source, white light source, among other light sources or any combination thereof.

The light source may be positioned any suitable distance from the sample (e.g., the flow stream in a flow cytometer), such as at a distance of 0.001 mm or more from the flow stream, such as 0.005 mm or more, such as 0.01 mm or more, such as 0.05 mm or more, such as 0.1 mm or more, such as 0.5 mm or more, such as 1 mm or more, such as 5 mm or more, such as 10 mm or more, such as 25 mm or more and including at a distance of 100 mm or more. In addition, the light source irradiate the sample at any suitable angle (e.g., relative the vertical axis of the flow stream), such as at an angle ranging from 10° to 90°, such as from 15° to 85°, such as from 20° to 80°, such as from 25° to 75° and including from 30° to 60°, for example at a 90° angle.

The light source may be configured to irradiate the sample continuously or in discrete intervals. In some instances, systems include a light source that is configured to irradiate the sample continuously, such as with a continuous wave laser that continuously irradiates the flow stream at the interrogation point in a flow cytometer. In other instances, systems of interest include a light source that is configured to irradiate the sample at discrete intervals, such as every 0.001 milliseconds, every 0.01 milliseconds, every 0.1 milliseconds, every 1 millisecond, every 10 milliseconds, every 100 milliseconds and including every 1000 milliseconds, or some other interval. Where the light source is configured to irradiate the sample at discrete intervals, systems may include one or more additional components to provide for intermittent irradiation of the sample with the light source. For example, the subject systems in these embodiments may include one or more laser beam choppers, manually or computer controlled beam stops for blocking and exposing the sample to the light source. In embodiments, light emitted by the sample is propagated to the subject light detection systems (as described above), having a plurality of photodetectors (e.g., a photodiode array). As described above, photodetectors in the subject photodetector arrays may include, but are not limited to optical sensors, such as active-pixel sensors (APSs), avalanche photodiode, image sensors, charge-coupled devices (CCDs), intensified charge-coupled devices (ICCDs), light emitting diodes, photon counters, bolometers, pyroelectric detectors, photoresistors, photovoltaic cells, photodiodes, photomultiplier tubes, phototransistors, quantum dot photoconductors or photodiodes and combinations thereof, among other photodetectors. In certain embodiments, light from a sample is measured with a charge-coupled device (CCD), semiconductor charge-coupled devices (CCD), active pixel sensors (APS), complementary metal-oxide semiconductor (CMOS) image sensors or N-type metal-oxide semiconductor (NMOS) image sensors.

In embodiments of the present disclosure, detectors of interest are configured to measure collected light at one or more wavelengths, such as at 2 or more wavelengths, such as at 5 or more different wavelengths, such as at 10 or more different wavelengths, such as at 25 or more different wavelengths, such as at 50 or more different wavelengths, such as at 100 or more different wavelengths, such as at 200 or more different wavelengths, such as at 300 or more different wavelengths and including measuring light emitted by a sample in the flow stream at 400 or more different wavelengths.

In some embodiments, detectors of interest are configured to measure collected light over a range of wavelengths (e.g., 200 nm-1000 nm). In certain embodiments, detectors of interest are configured to collect spectra of light over a range of wavelengths. For example, systems may include one or more detectors configured to collect spectra of light over one or more of the wavelength ranges of 200 nm-1000 nm. In yet other embodiments, detectors of interest are configured to measure light emitted by a sample in the flow stream at one or more specific wavelengths. For example, systems may include one or more detectors configured to measure light at one or more of 450 nm, 518 nm, 519 nm, 561 nm, 578 nm, 605 nm, 607 nm, 625 nm, 650 nm, 660 nm, 667 nm, 670 nm, 668 nm, 695 nm, 710 nm, 723 nm, 780 nm, 785 nm, 647 nm, 617 nm and any combinations thereof. In certain embodiments, one or more detectors may be configured to be paired with specific fluorophores, such as those used with the sample in a fluorescence assay.

In embodiments, the photodetectors of the light detection system are configured to measure light continuously or in discrete intervals. In some instances, detectors of interest are configured to take measurements of the collected light continuously. In other instances, detectors of interest are configured to take measurements in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval.

In some embodiments, systems for measuring light from a sample include one or more light dispersion components configured to disperse a spectrum of light from the sample. The term "light dispersion" is used herein in its conventional sense to refer to an optical component which disperses (e.g., resolves) different wavelengths of the light. Examples of light dispersion components of interest include, but are not limited to, prisms, diffraction gratings, spectrometers among other types of light dispersion components. In some embodiments, prisms of interest include dispersive prisms, such as an equilateral dispersive prism, a triangular prism, an Abbe prism, a Pellin-Broca prism, an Amici prism, a compound prism, a dispersive prism coupled to a diffraction grating, reflective prisms such as a Porro prism, a Porro-Abbe prism, an Amici roof prism, a pentaprism, an Abbe-Koenig prism, a Schmidt-Pechan prism, a Bauernfeind prism, a Dove prism, a retroreflector prism, a beamsplitting prism such as a beam splitter cube, a dichroic prism, a polarizing prism such as a Nicol prism, a Wollaston prism, a Nomarski prism, a Rochon prism, a Senarmont prism, a Glan-Foucault prism, a Glan-Taylor prism, a Glan-Thompson prism or a deflecting prism such as a wedge prism, a Risley prism, a Rhomboid prism, among other types of prisms. Prisms of interest may be formed from any suitable material including but not limited to glass (e.g., N-SF10, N-SF11, N-SF57, N-BK7, N-LAK21 or N-LAF35 glass), silica (e.g., fused silica), quartz, crystal (e.g., CaF2 crystal), zinc selenide (ZnSe), F2, germanium (Ge) titanate (e.g., S-TIH11), borosilicate (e.g., BK7).

The subject light dispersion component is configured to disperse a spectrum of light from the sample. In some embodiments, the light dispersion component is such as a spectrum having a wavelength ranging from 200 nm to 1200 nm, such as from 250 nm to 1150 nm, such as from 300 nm to 1100 nm, such as from 350 nm to 1050 nm, such as from 400 nm to 1000 nm and including from 500 nm to 900 nm. In some embodiments, the light dispersion component is a UV dispersive component that is configured to project the UV spectrum of light from the sample onto the photodetector component of the light detection system, such as a spectrum of wavelengths that range from 150 nm to 400 nm, such as from 175 nm to 375 nm and including from 200 nm to 300 nm. In other embodiments, the light dispersion component is a visible light dispersive component that is configured to project the visible light spectrum of light from the sample onto the photodetector component of the light detection system, such as a spectrum of wavelengths that range from 400 nm to 1000 nm, such as from 500 nm to 900 nm and including from 600 nm to 800 nm. In still other embodiments, the light dispersion component is a near infrared (NIR) light dispersive component that is configured to project the NIR light spectrum of light from the sample onto the photodetector component of the light detection system, such as a spectrum of wavelengths that range from 1000 nm to 1600 nm, such as from 1100 nm to 1500 nm and including from 1200 nm to 1400 nm.

The light dispersion component may be oriented with respect to the photodetectors of the light detection system (as referenced in an X-Z plane) at an angle ranging from 10° to 180°, such as from 15° to 170°, such as from 20° to 160°, such as from 25° to 150°, such as from 30° to 120° and including from 45° to 90°. The light dispersion component may be positioned any suitable distance from the photodetectors, such as at a distance of 0.001 mm or more from the flow stream, such as 0.005 mm or more, such as 0.01 mm or more, such as 0.05 mm or more, such as 0.1 mm or more, such as 0.5 mm or more, such as 1 mm or more, such as 5 mm or more, such as 10 mm or more, such as 25 mm or more and including at a distance of 100 mm or more.

In some embodiments, systems for measuring light from a sample include a light collection system for collecting and directing light from the sample source (e.g., flow stream) to the plurality of photodetectors (e.g., photodetector array) of the subject light detections systems. The optical collection system may be physically coupled to one or more of the photodetectors, such as with an adhesive, co-molded together or integrated into the photodetector. In certain embodiments, the optical collection system and the light detection system are integrated into a single unit.

In other embodiments, the light detection system and the optical collection system are in optical communication, but are not physically in contact. For example, the optical collection system may be positioned 0.001 mm or more from the first photodetector array, such as 0.005 mm or more, such as 0.01 mm or more, such as 0.05 mm or more, such as 0.1 mm or more, such as 0.5 mm or more, such as 1 mm or more, such as 10 mm or more, such as 25 mm or more, such as 50 mm or more and including 100 mm or more from the light detection system.

In embodiments, the light dispersion component (e.g., prism, diffraction grating) is spatially adjustable. The light dispersion component may be adjusted to change the horizontal position of the light dispersion component (e.g., with respect to the flow stream or laser), the vertical position of the light dispersion component, the angle of orientation of the light dispersion component or a combination thereof. In some embodiments, the light dispersion component is configured to be spatially adjustable and configured to change the horizontal position of the light dispersion component (e.g., in an X-Y plane along a horizontal axis of the flow stream). For example, the horizontal position of the light dispersion component may be moved by 0.0001 mm or more, such as by 0.0005 mm or more, such as by 0.001 mm or more, such as by 0.005 mm or more, such as by 0.01 mm or more, such as by 0.05 mm or more, such as by 0.1 mm or more, such as by 0.5 mm or more, such as by 1 mm or more, such as by 2 mm or more, such as by 3 mm or more, such as by 4 mm or more, such as by 5 mm or more, such as by 10 mm or more and including moving the horizontal position of the light dispersion component by 25 mm or more.

In other embodiments, the light dispersion component is spatially adjustable and configured to change the vertical position of the light dispersion component (e.g., along the longitudinal axis of the flow stream) For example, the vertical position of the light dispersion component may be moved by 0.0001 mm or more, such as by 0.0005 mm or more, such as by 0.001 mm or more, such as by 0.005 mm or more, such as by 0.01 mm or more, such as by 0.05 mm or more, such as by 0.1 mm or more, such as by 0.5 mm or more, such as by 1 mm or more, such as by 2 mm or more, such as by 3 mm or more, such as by 4 mm or more, such as by 5 mm or more, such as by 10 mm or more and including moving the vertical position of the light dispersion component by 25 mm or more (e.g., along the longitudinal axis of the flow stream).

In other embodiments, the light dispersion component is spatially adjustable and configured to change the angle of orientation of the light dispersion component. For example, the light dispersion component may be adjusted such that the orientation of the light dispersion component is changed by 0.1° or more, such as by 0.2° or more, such as by 0.3° or more, such as by 0.4° or more, such as by 0.5° or more, such as by 1° or more, such as by 2° or more, such as by 3° or more, such as by 4° or more, such as by 5° or more, such as by 10° or more, such as by 15° or more, such as by 20° or more, such as by 25° or more, such as by 30° or more and including by changing the angle of orientation of the light dispersion component by 45° or more.

The light dispersion component is configured to be spatially adjustable continuously or in discrete increments, such as in increments of 0.001 mm or more, such as 0.005 mm or more, such as 0.01 mm or more, such as 0.05 mm or more, such as 0.1 mm or more, such as 0.5 mm or more, such as 1 mm or more, such as 2 mm or more and including displacing the light dispersion component along the horizontal axis of the flow stream in increments of 5 mm or more. In another example, the light dispersion component is displaced along the vertical axis of flow stream in discrete increments, such as in increments of 0.001 mm or more, such as 0.005 mm or more, such as 0.01 mm or more, such as 0.05 mm or more, such as 0.1 mm or more, such as 0.5 mm or more, such as 1 mm or more, such as 2 mm or more and including displacing the light dispersion component along the vertical axis of the flow stream in increments of 5 mm or more. In yet another example, the angle of orientation of the light dispersion component is adjustable in discrete increments, such as in increments of 0.1° or more, such as 0.2° or more, such as 0.3° or more, such as 0.4° or more, such as 0.5° or more, such as 1° or more, such as 2° or more, such as 3° or more, such as 4° or more and including 5° or more.

In some embodiments, the light dispersion component is movable (e.g., manually, mechanically or with a motor-driven displacement device). In other embodiments, the light dispersion component is coupled to a support stage that is movable. In some instance, the light dispersion component is configured to be moved manually. In other instances, the light dispersion component is configured to be moved mechanically, such as being directly coupled to a mechanical leadscrew assembly or a mechanically operated geared translation device or where the mechanical leadscrew assembly or a mechanically operated geared translation device are coupled to the support stage. In yet other instances, the small angle prism is configured to be moved with a motor-driven displacement device, such as where the light dispersion component is coupled to a motor actuated displacement stage, motor driven leadscrew assembly, motor-operated geared actuation device employing a stepper motor, servo motor, brushless electric motor, brushed DC motor, micro-step drive motor, high resolution stepper motor, among other types of motors.

Systems of interest may also include one or more optical adjustment protocols. As discussed above, the term "optical adjustment" refers to any device that is capable of changing the spatial width irradiation or some other characteristic of irradiation from a light source, such as for example, irradiation direction, wavelength, beam profile, beam width, beam intensity, focal point and pulse width. In some embodiments, systems may include an optical adjustment protocol that adjusts one or more of irradiation direction, wavelength, beam profile, beam width, beam intensity, focal point and pulse width of the irradiating light source. In other embodiments, systems may also include an optical adjustment protocol that adjusts the light collected from the sample, such as focus.

In embodiments, optical adjustment protocols, including but not limited to lenses, mirrors, filters, fiber optics, wavelength separators, pinholes, slits, collimating protocols and combinations thereof. In certain embodiments, systems of interest include one or more focusing lenses. The focusing lens, in one example may be a de-magnifying lens. In another example, the focusing lens is a magnifying lens. In other embodiments, systems of interest include one or more mirrors.

In some embodiments, light from the sample is collected with an optical collection system that includes fiber optics. For example, in some instances the optical collection system may be a fiber optics light relay bundle and light is conveyed through the fiber optics light relay bundle to the photodetector component of the light detection system, discussed above. In other embodiments, the optical collection system includes a free-space light relay system. For instance, the free-space light relay system may include a housing having a proximal end and a distal end, the proximal end being coupled to the photodetector component of the light detection system. The free-space relay system may include any combination of different optical adjustment components, such as one or more lenses, mirrors, slits, pinholes, wavelength separators, or a combination thereof.

In certain embodiments, the subject systems are flow cytometric systems employing the above described light detection system for detecting light emitted by a sample in a flow stream. Suitable flow cytometry systems and methods for analyzing samples include, but are not limited to those described in Ormerod (ed.), *Flow Cytometry: A Practical Approach*, Oxford Univ. Press (1997); Jaroszeski et al. (eds.), Flow Cytometry Protocols, Methods in Molecular Biology No. 91, Humana Press (1997); *Practical Flow Cytometry*, 3rd ed., Wiley-Liss (1995); Virgo, et al. (2012) *Ann Clin Biochem*. January; 49 (pt 1):17-28; Linden, et. al., *Semin Throm Hemost*. 2004 Oct. 30(5):502-11; Alison, et al. *J Pathol*, 2010 December; 222(4):335-344; and Herbig, et al. (2007) *Crit Rev Ther Drug Carrier Syst*. 24(3):203-255; the disclosures of which are incorporated herein by reference. In certain instances, flow cytometry systems of interest include BD Biosciences FACSCanto™ flow cytometer, BD Biosciences FACSVantage™, BD Biosciences FACSort™, BD Biosciences FACSCount™, BD Biosciences FACScan™, and BD Biosciences FACSCalibur™ systems, a BD Biosciences Influx™ cell sorter, BD Biosciences Jazz™ cell sorter and BD Biosciences Aria™ cell sorter or the like.

In some embodiments, the subject systems are flow cytometric systems, such those described in U.S. Pat. Nos. 3,960,449; 4,347,935; 4,667,830; 4,704,891; 4,770,992; 5,030,002; 5,040,890; 5,047,321; 5,245,318; 5,317,162; 5,464,581; 5,483,469; 5,602,039; 5,620,842; 5,627,040; 5,643,796; 5,700,692; 6,372,506; 6,809,804; 6,813,017; 6,821,740; 7,129,505; 7,201,875; 7,544,326; 8,140,300; 8,233,146; 8,753,573; 8,975,595; 9,092,034; 9,095,494 and 9,097,640; the disclosure of which are herein incorporated by reference in their entirety.

In certain embodiments, the subject systems are flow cytometric systems having an excitation module that uses radio-frequency multiplexed excitation to generate a plurality of frequency shifted beams of light. In these embodiments, the laser light generator may include a plurality of lasers and one or more acousto-optic components (e.g., an acoustooptic deflector, an acoustooptic frequency shifter) to generate a plurality of frequency shifted comb beams. One or more of the frequency shifted comb beams and local oscillator beams may be configured to be received by a beam shaping component as described here to produce one or more beams of frequency shifted light having a substantially constant intensity profile. In certain instances, the subject systems are flow cytometric systems having a laser excitation module as described in U.S. Pat. Nos. 9,423,353 and 9,784,661 and U.S. Patent Publication Nos. 2017/0133857 and 2017/0350803, the disclosures of which are herein incorporated by reference.

Methods for Measuring Light Collected from an Irradiated Sample

Aspects of the disclosure also include methods for measuring light from a sample (e.g., in the flow stream in a flow cytometer). In practicing methods according to embodiments, a sample is irradiated with a light source and light from the sample is detected with the light detection systems a plurality of photodetectors, an amplifier component and an electronic switch component, as described above. In some embodiments, the sample is a biological sample. The term "biological sample" is used in its conventional sense to refer to a whole organism, plant, fungi or a subset of animal tissues, cells or component parts which may in certain instances be found in blood, mucus, lymphatic fluid, synovial fluid, cerebrospinal fluid, saliva, bronchoalveolar lavage, amniotic fluid, amniotic cord blood, urine, vaginal fluid and semen. As such, a "biological sample" refers to both the native organism or a subset of its tissues as well as to a homogenate, lysate or extract prepared from the organism or a subset of its tissues, including but not limited to, for example, plasma, serum, spinal fluid, lymph fluid, sections of the skin, respiratory, gastrointestinal, cardiovascular, and genitourinary tracts, tears, saliva, milk, blood cells, tumors, organs. Biological samples may be any type of organismic tissue, including both healthy and diseased tissue (e.g., cancerous, malignant, necrotic, etc.). In certain embodiments, the biological sample is a liquid sample, such as blood or derivative thereof, e.g., plasma, tears, urine, semen, etc., where in some instances the sample is a blood sample, including whole blood, such as blood obtained from venipuncture or fingerstick (where the blood may or may not be combined with any reagents prior to assay, such as preservatives, anticoagulants, etc.).

In certain embodiments the source of the sample is a "mammal" or "mammalian", where these terms are used broadly to describe organisms which are within the class mammalia, including the orders carnivore (e.g., dogs and cats), rodentia (e.g., mice, guinea pigs, and rats), and primates (e.g., humans, chimpanzees, and monkeys). In some instances, the subjects are humans. The methods may be applied to samples obtained from human subjects of both genders and at any stage of development (i.e., neonates, infant, juvenile, adolescent, adult), where in certain embodiments the human subject is a juvenile, adolescent or adult. While the present invention may be applied to samples from a human subject, it is to be understood that the methods may also be carried-out on samples from other animal subjects (that is, in "non-human subjects") such as, but not limited to, birds, mice, rats, dogs, cats, livestock and horses.

In practicing the subject methods, a sample (e.g., in a flow stream of a flow cytometer) is irradiated with light from a light source. In some embodiments, the light source is a broadband light source, emitting light having a broad range of wavelengths, such as for example, spanning 50 nm or more, such as 100 nm or more, such as 150 nm or more, such as 200 nm or more, such as 250 nm or more, such as 300 nm or more, such as 350 nm or more, such as 400 nm or more and including spanning 500 nm or more. For example, one suitable broadband light source emits light having wavelengths from 200 nm to 1500 nm. Another example of a suitable broadband light source includes a light source that emits light having wavelengths from 400 nm to 1000 nm. Where methods include irradiating with a broadband light source, broadband light source protocols of interest may include, but are not limited to, a halogen lamp, deuterium arc lamp, xenon arc lamp, stabilized fiber-coupled broadband light source, a broadband LED with continuous spectrum, superluminescent emitting diode, semiconductor light emitting diode, wide spectrum LED white light source, an multi-LED integrated white light source, among other broadband light sources or any combination thereof.

In other embodiments, methods includes irradiating with a narrow band light source emitting a particular wavelength or a narrow range of wavelengths, such as for example with a light source which emits light in a narrow range of wavelengths like a range of 50 nm or less, such as 40 nm or less, such as 30 nm or less, such as 25 nm or less, such as 20 nm or less, such as 15 nm or less, such as 10 nm or less, such as 5 nm or less, such as 2 nm or less and including light sources which emit a specific wavelength of light (i.e., monochromatic light). Where methods include irradiating with a narrow band light source, narrow band light source protocols of interest may include, but are not limited to, a narrow wavelength LED, laser diode or a broadband light source coupled to one or more optical bandpass filters, diffraction gratings, monochromators or any combination thereof.

In certain embodiments, methods include irradiating the sample with one or more lasers. As discussed above, the type and number of lasers will vary depending on the sample as well as desired light collected and may be a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof. In others instances, the methods include irradiating the flow stream with a dye laser, such as a stilbene, coumarin or rhodamine laser. In yet other instances, methods include irradiating the flow stream with a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof. In still other instances, methods include irradiating the flow stream with a solid-state laser, such as a ruby laser, an Nd:YAG laser, NdCrYAG laser, Er:YAG laser, Nd:YLF laser, Nd:YVO$_4$ laser, Nd:YCa$_4$O(BO$_3$)$_3$ laser, Nd:YCOB laser, titanium sapphire laser, thulim YAG laser, ytterbium YAG laser, ytterbium$_2$O$_3$ laser or cerium doped lasers and combinations thereof.

The sample may be irradiated with one or more of the above mentioned light sources, such as 2 or more light sources, such as 3 or more light sources, such as 4 or more light sources, such as 5 or more light sources and including 10 or more light sources. The light source may include any combination of types of light sources. For example, in some embodiments, the methods include irradiating the sample in the flow stream with an array of lasers, such as an array having one or more gas lasers, one or more dye lasers and one or more solid-state lasers.

The sample may be irradiated with wavelengths ranging from 200 nm to 1500 nm, such as from 250 nm to 1250 nm, such as from 300 nm to 1000 nm, such as from 350 nm to 900 nm and including from 400 nm to 800 nm. For example, where the light source is a broadband light source, the sample may be irradiated with wavelengths from 200 nm to 900 nm. In other instances, where the light source includes a plurality of narrow band light sources, the sample may be irradiated with specific wavelengths in the range from 200 nm to 900 nm. For example, the light source may be plurality of narrow band LEDs (1 nm-25 nm) each independently emitting light having a range of wavelengths between 200 nm to 900 nm. In other embodiments, the narrow band light source includes one or more lasers (such as a laser array) and the sample is irradiated with specific wavelengths ranging from 200 nm to 700 nm, such as with a laser array having gas lasers, excimer lasers, dye lasers, metal vapor lasers and solid-state laser as described above.

Where more than one light source is employed, the sample may be irradiated with the light sources simultaneously or sequentially, or a combination thereof. For example, the sample may be simultaneously irradiated with each of the light sources. In other embodiments, the flow stream is sequentially irradiated with each of the light sources. Where more than one light source is employed to irradiate the sample sequentially, the time each light source irradiates the sample may independently be 0.001 microseconds or more, such as 0.01 microseconds or more, such as 0.1 microseconds or more, such as 1 microsecond or more, such as 5 microseconds or more, such as 10 microseconds or more, such as 30 microseconds or more and including 60 microseconds or more. For example, methods may include irradiating the sample with the light source (e.g. laser) for a duration which ranges from 0.001 microseconds to 100 microseconds, such as from 0.01 microseconds to 75 microseconds, such as from 0.1 microseconds to 50 microseconds, such as from 1 microsecond to 25 microseconds and including from 5 microseconds to 10 microseconds. In embodiments where sample is sequentially irradiated with two or more light sources, the duration sample is irradiated by each light source may be the same or different.

The time period between irradiation by each light source may also vary, as desired, being separated independently by a delay of 0.001 microseconds or more, such as 0.01 microseconds or more, such as 0.1 microseconds or more, such as 1 microsecond or more, such as 5 microseconds or more, such as by 10 microseconds or more, such as by 15 microseconds or more, such as by 30 microseconds or more and including by 60 microseconds or more. For example, the time period between irradiation by each light source may range from 0.001 microseconds to 60 microseconds, such as from 0.01 microseconds to 50 microseconds, such as from 0.1 microseconds to 35 microseconds, such as from 1 microsecond to 25 microseconds and including from 5 microseconds to 10 microseconds. In certain embodiments, the time period between irradiation by each light source is 10 microseconds. In embodiments where sample is sequentially irradiated by more than two (i.e., 3 or more) light sources, the delay between irradiation by each light source may be the same or different.

The sample may be irradiated continuously or in discrete intervals. In some instances, methods include irradiating the sample in the sample with the light source continuously. In other instances, the sample in is irradiated with the light source in discrete intervals, such as irradiating every 0.001 millisecond, every 0.01 millisecond, every 0.1 millisecond, every 1 millisecond, every 10 milliseconds, every 100 milliseconds and including every 1000 milliseconds, or some other interval.

Depending on the light source, the sample may be irradiated from a distance which varies such as 0.01 mm or more, such as 0.05 mm or more, such as 0.1 mm or more, such as 0.5 mm or more, such as 1 mm or more, such as 2.5 mm or more, such as 5 mm or more, such as 10 mm or more, such as 15 mm or more, such as 25 mm or more and including 50 mm or more. Also, the angle or irradiation may also vary, ranging from 10° to 90°, such as from 15° to 85°, such as from 20° to 80°, such as from 25° to 75° and including from 30° to 60°, for example at a 90° angle.

As discussed above, in embodiments light from the irradiated sample is conveyed to a light detection system as described herein and measured by the plurality of photodetectors. In practicing the subject methods, light is dispersed with a light dispersion component. Light may be dispersed across the plurality of photodetectors with any convenient optical component that disperses different wavelengths of light, including but not limited to prisms, diffraction gratings, spectrometers among other types of light dispersion components. In embodiments, light from the sample is propagated to the light dispersion component and the spectrum of light from the light is dispersed across the plurality of photodetectors in the subject light detection systems. In some embodiments, the light dispersion component is such as a spectrum having a wavelength ranging from 200 nm to 1200 nm, such as from 250 nm to 1150 nm, such as from 300 nm to 1100 nm, such as from 350 nm to 1050 nm, such as from 400 nm to 1000 nm and including from 500 nm to 900 nm. In some embodiments, the light dispersion component is a UV dispersive component that is configured to project the UV spectrum of light from the sample onto the photodetector component of the light detection system, such as a spectrum of wavelengths that range from 150 nm to 400 nm, such as from 175 nm to 375 nm and including from 200 nm to 300 nm. In other embodiments, the light dispersion component is a visible light dispersive component that is configured to project the visible light spectrum of light from the sample onto the photodetector component of the light detection system, such as a spectrum of wavelengths that range from 400 nm to 1000 nm, such as from 500 nm to 900 nm and including from 600 nm to 800 nm. In still other embodiments, the light dispersion component is a near infrared (NIR) light dispersive component that is configured to project the NIR light spectrum of light from the sample onto the photodetector component of the light detection system, such as a spectrum of wavelengths that range from 1000 nm to 1600 nm, such as from 1100 nm to 1500 nm and including from 1200 nm to 1400 nm.

In some embodiments, methods include measuring the collected light over a range of wavelengths (e.g., 200 nm-1000 nm). For example, methods may include collecting spectra of light over one or more of the wavelength ranges of 200 nm-1000 nm. In yet other embodiments, methods include measuring collected light at one or more specific wavelengths. For example, the collected light may be measured at one or more of 450 nm, 518 nm, 519 nm, 561 nm, 578 nm, 605 nm, 607 nm, 625 nm, 650 nm, 660 nm, 667 nm, 670 nm, 668 nm, 695 nm, 710 nm, 723 nm, 780 nm, 785 nm, 647 nm, 617 nm and any combinations thereof. In certain embodiments, methods including measuring wavelengths of light which correspond to the fluorescence peak wavelength of certain fluorophores.

The collected light may be measured continuously or in discrete intervals. In some instances, methods include taking measurements of the light continuously. In other instances, the light is measured in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval.

Measurements of the collected light may be taken one or more times during the subject methods, such as 2 or more times, such as 3 or more times, such as 5 or more times and including 10 or more times. In certain embodiments, the light propagation is measured 2 or more times, with the data in certain instances being averaged.

Light from the sample is measured at one or more wavelengths of the dispersed spectrum, such as at 5 or more different wavelengths, such as at 10 or more different wavelengths, such as at 25 or more different wavelengths, such as at 50 or more different wavelengths, such as at 100 or more different wavelengths, such as at 200 or more different wavelengths, such as at 300 or more different wavelengths and including measuring the collected light at 400 or more different wavelengths.

In embodiments, methods may include differentially obscuring one or more wavelengths from the dispersed spectrum of light on the plurality of photodetectors. In some embodiments, methods include receiving signals from the plurality of photodetectors with the electronic switch component and differentially propagating the signals from the photodetectors to the amplifier component, such that one or more wavelengths of light detected by the photodetectors are obscured. For example, methods may include differentially propagating signals from one or more of the photodetectors, such as signals from 2 or more of the photodetectors, such as signals from 3 or more of the photodetectors, such as signals from 3 or more of the photodetectors, such as signals from 4 or more of the photodetectors, such as signals from 8 or more of the photodetectors, such as signals from 16 or more of the photodetectors, such as signals from 32 or more of the photodetectors and including differentially propagating signals from 64 or more of the photodetectors. In these embodiments, one or more wavelengths of light can be obscured, such as 2 or more wavelengths of light, such as 3 or more wavelengths of light, such as 4 or more wavelengths of light, such as 5 or more wavelengths of light, such as 10 or more wavelengths of light, such as 25 or more wavelengths of light, such as 50 or more wavelengths of light, such as 100 or more wavelengths of light and including 250 or more wavelengths of light. In certain embodiments, methods include differentially propagating, with the electronic switch component, signals from the photodetectors to the amplifier component, such that one or more wavelength ranges detected by the photodetectors can be obscured, such as 2 or more wavelength ranges, such as 3 or more wavelength ranges, such as 3 or more wavelength ranges, such as 4 or more wavelength ranges, such as 5 or more wavelength ranges, such as 10 or more wavelength ranges and including 25 or more wavelength ranges.

In some embodiments, methods include differentially detecting a specific portion of the spectral profile of light from the sample by obscuring with the electronic switch component particular wavelengths in the range of 200 nm to 1000 nm. For example, methods may include obscuring with the electronic switch component a specific portion of the spectral profile of light from a sample, such as to measure and generate light detection signals at one or more of 450 nm, 518 nm, 519 nm, 561 nm, 578 nm, 605 nm, 607 nm, 625 nm, 650 nm, 660 nm, 667 nm, 670 nm, 668 nm, 695 nm, 710 nm, 723 nm, 780 nm, 785 nm, 647 nm, 617 nm and any combinations thereof.

In other embodiments, methods include receiving amplified signals with the electronic switch component from the amplifier component. In some instances, the signals from the amplifier component are signals which are directly propagated to the amplifier component from the photodetectors. In other embodiments, the electronic switch component is configured to differentially propagate the amplified signals from the amplifier component (e.g., having a plurality of transimpedence amplifiers) to a second amplifier component (e.g., having a plurality of summing amplifiers), such that one or more wavelengths of light detected by the photodetectors can be obscured. In some instances, methods include obscuring one or more amplified signals with the electronic switch components, such as 2 or more amplified signals, such as 3 or more amplified signals, such as 4 or more amplified signals, such as 6 or more amplified signals, such as 8 or more amplified signals, such as 16 or more amplified signals, such as 32 or more amplified signals and including 64 or more amplified signals. In these embodiments, methods include obscuring one or more wavelengths of light, such as 2 or more wavelengths of light, such as 3 or more wavelengths of light, such as 4 or more wavelengths of light, such as 5 or more wavelengths of light, such as 10 or more wavelengths of light, such as 25 or more wavelengths of light, such as 50 or more wavelengths of light, such as 100 or more wavelengths of light and including 250 or more wavelengths of light. In certain instances, methods include differentially propagating with the electronic switch component, amplified signals from a first amplifier component to a second amplifier component, such that one or more wavelength ranges detected by the photodetectors can be obscured, such as 2 or more wavelength ranges, such as 3 or more wavelength ranges, such as 3 or more wavelength ranges, such as 4 or more wavelength ranges, such as 5 or more wavelength ranges, such as 10 or more wavelength ranges and including 25 or more wavelength ranges. For example, methods may include differentially propagating with the electronic switch component amplified signals from a first amplifier component (e.g., having a plurality of transimpedence amplifiers) to a second amplifier component (e.g., having a plurality of summing amplifiers) to obscure predetermined wavelengths or wavelength ranges such that a specific portion of the spectral profile of light from a sample can be differentially detected, for example where particular wavelengths in the range of 200 nm to 1000 nm can be differentially detected.

In some embodiments, methods include adjusting the light before detecting the light with the subject light detection systems. For example, the light from the sample source may be passed through one or more lenses, mirrors, pinholes, slits, light refractors, and any combination thereof. In some instances, the collected light is passed through one or more focusing lenses, such as to reduce the profile of the light directed to the light detection system or optical collection system as described above. In other instances, the emitted light from the sample is passed through one or more collimators to reduce light beam divergence conveyed to the light detection system.

Methods for Optimized Differential Obscuration of Light from a Sample

Aspects of the present disclosure also include methods for optimizing differential obscuration of light from a sample. The subject light detection systems are configured to differentially obscure one or more wavelengths of light emanating from a sample by: 1) not detecting the light with the photodetector; or 2) not generating an electronic signal in response to detection of the light. In some embodiments, one or more wavelengths of light are differentially obscured by using one or more optical bandpass filters to prevent detection of the light with the photodetector. In other embodiments, the bandpass filter is an optoelectronic component having an amplifier component and an electronic switch component as described in detail above and methods according certain embodiments include: 1) receiving signals from the plurality of photodetectors with the electronic switch component and differentially propagating the signals from the photodetectors to the amplifier component; or 2) receiving signals from a first amplifier component with the electronic switch component and differentially propagating the amplified signals from the first amplifier component to a second amplifier component, such that one or more wavelengths of light detected by the photodetectors are obscured. In these embodiments, one or more wavelengths of light are obscured, such as 2 or more wavelengths of light, such as 3 or more wavelengths of light, such as 4 or more wavelengths of light, such as 5 or more wavelengths of light, such as 10 or more wavelengths of light, such as 25 or more wavelengths of light, such as 50 or more wavelengths of light, such as 100 or more wavelengths of light and including 250 or more wavelengths of light.

Methods for optimizing differential obscuration of light from a sample with the subject light collection systems according to embodiments of the present disclosure include identifying a population of different bandpass filters for use in detecting light emitted from a plurality of fluorophores with two or more photodetectors; calculating a cost function for each bandpass filter using a spillover matrix that includes spillover coefficients determined from fluorescence spectra of the plurality of fluorophores; and determining an optimal bandpass filter for detecting light from a sample that includes the plurality of fluorophores with the two or more photodetectors based on the calculated cost function.

In embodiments, samples may include 2 or more fluorophores, such as 3 or more fluorophores, such as 4 or more fluorophores, such as 5 or more fluorophores, such as 6 or more fluorophores, such as 7 or more fluorophores, such as 8 or more fluorophores, such as 9 or more fluorophores and including 10 or more fluorophores. As described above, light detection systems for detecting light from the sample include a plurality of photodetectors, such as 2 or more photodetectors, such as 3 or more photodetectors, such as 4 or more photodetectors, such as 5 or more photodetectors, such as 6 or more photodetectors, such as 7 or more photodetectors, such as 8 or more photodetectors, such as 9 or more photodetectors and including 10 or more photodetectors. In practicing the subject methods for optimizing differential obscuration of light from a sample, the number of photodetectors in the subject light detection system may include an equal number of photodetectors as fluorophores present in the sample (i.e., M=N, where M is the number of photodetectors and N is the number of fluorophores) In these embodiments, a first step may be to select the fluorophores of interest in the sample and the number of detectors used in the light detection system. The fluorescence spectra of each fluorophore may be determined, such as by measurement of a fluorophore sample or by loading a control spectrum. In some embodiments, methods include determining the brightness of the each fluorophore in the sample. Photoelectrons to each fluorophore may be assigned to each fluorophore in the sample and how the photoelectrons may be divided between the photodetectors of the photodetector component based on the spillover matrix is, in certain embodiments, further determined.

To determine a cost function for each bandpass filter, methods include detecting light emitted from a plurality of fluorophores with two or more photodetectors comprising a bandpass filter; determining a spillover matrix for the fluorescence spectra of the plurality of fluorophores; and calculating a cost function for detecting the light with the bandpass filter based on the spillover matrix. The spillover matrix according to certain embodiments includes Mx N spillover coefficients, where M is the number of photodetectors used to detect the light emitted from the plurality of fluorophores and N is the number of fluorophores. In some embodiments, methods include determining an uncertainty factor associated with each fluorophore. In some instances, determining the uncertainty factor includes using linear regression to calculate the uncertainty factor. In other instances, determining the uncertainty factor includes using an ordinary least squares solution to calculate the uncertainty factor. The uncertainty factors calculated for each fluorophore may be added in quadrature to determine the cost function for each bandpass filter. In certain embodiments, the cost function is calculated according to equation (1):

$$\text{Cost Function} = \sum_{i=1}^{n} (dF_i)^2$$

where n is the number of fluorophores; and dF is the determined uncertainty associated with each fluorophore.

In some embodiments, methods for optimizing differential obscuration of light from a sample with the subject light collection systems include conducting a genetic algorithm to determine an optimal set of bandpass filters for detecting light emanating from a sample having a plurality of fluorophores. The term "genetic algorithm" is used herein in its conventional sense to refer to an algorithm for solving constrained or unconstrained optimization problems by iteration toward better, higher quality solutions and may include operators such as mutation, crossover and selection of preferred solutions. As described in greater detail below, each of the below steps for selecting an optimal set of bandpass filters may be repeated one or more times, such as 2 or more times, such as 3 or more times, such as 4 or more times, such as 5 or more times, such as 10 or more times, such as 15 or more times, such as 25 or more times, such as 50 or more times and including 100 or more times, as desired.

In practicing the subject methods, a population of different bandpass filters for use in detecting light emitted from a plurality of fluorophores with two or more photodetectors are identified and a cost function for each bandpass filter using a spillover matrix that comprises spillover coefficients determined from fluorescence spectra of the plurality of fluorophores is calculated. In some embodiments, methods further include mutating one or more of the bandpass filters in the identified population to produce a mutated population of bandpass filters, such that the mutated population comprises bandpass filters having wavelengths that are shifted as compared to the bandpass filters of the identified population; and calculating a cost function for each bandpass filter of the mutated population. For example, mutating the population of bandpass filters may include incrementally shifting one or more of the bandpass filters to a different wavelength, such as by 0.1 nm or more, such as by 0.2 nm or more, such as by 0.3 nm or more, such as by 0.4 nm or more, such as by 0.5 nm or more, such as by 1 nm or more, such as by 2 nm or more, such as by 3 nm or more, such as by 4 nm or more and including by 5 nm or more. Accordingly, mutating the population of bandpass filters may include shifting the wavelength of one or more of the bandpass filters by 1% or more, such as by 2% or more, such as 5% or more, such as by 10% or more, such as by 15% or more, such as by 25% or more, such as by 50% or more, such as by 75% or more and including by 90% or more.

In some embodiments, methods include mutating the population of bandpass filters by bathochromically shifting one or more of the population of bandpass filters, such as bathochromically shifting 2 or more bandpass filters, such as 3 or more bandpass filters, such as 5 or more bandpass filters and including 10 or more bandpass filters. For example, 5% or more of the bandpass filters in the identified population may be bathochromically shifted, such as 10% or more, such as 25% or more, such as 50% or more, such as 75% or more, such as 90% or more and including mutating the population of bandpass filters by bathochromically shifting all of the bandpass filters. In other embodiments, methods include mutating the population of bandpass filters by hypsochromically shifting one or more of the population of bandpass filters, such as hypsochromically shifting 2 or more bandpass filters, such as 3 or more bandpass filters, such as 5 or more bandpass filters and including 10 or more bandpass filters. For example, 5% or more of the bandpass filters in the identified population may be hypsochromically shifted, such as 10% or more, such as 25% or more, such as 50% or more, such as 75% or more, such as 90% or more and including mutating the population of bandpass filters by hypsochromically shifting all of the bandpass filters.

In some embodiments, methods further include mating two or more different bandpass filters from the identified population and the mutated population to produce an offspring population of bandpass filters, where each offspring bandpass filter comprises wavelengths randomly selected from the mated bandpass filters; and calculating a cost function for each bandpass filter of the offspring population. The term "mating" is used herein in its conventional sense to refer to combining two or more of the different bandpass filters of the identified population and the mutated population such that the offspring population of bandpass filters have characteristics (e.g., bandpass wavelengths) of the parent population (i.e., identified population or mutated population). Any number of bandpass filters may be mated from the identified population of bandpass filters and mutated population of bandpass filters, such as 3 or more, such as 4 or more, such as 5 or more, such as 6 or more, such as 8 or more, such as 10 or more and including 20 or more. In these embodiments, any combination of different bandpass filters from each population (e.g., identified population, mutated population) may be combined, such as where one or more bandpass filters from the identified population is mated with one or more of the bandpass filters of the mutated population.

To determine an optimal set of bandpass filters for detecting light from a sample having a plurality of fluorophores, the calculated cost function for each bandpass filter in the identified, mutated and offspring populations are assessed. By assessed is meant that the calculated cost functions of each bandpass filter are evaluated and in certain instances, the bandpass filters are ranked based on the calculated cost function. In some embodiments, methods further include discarding the bandpass filters having a cost function below a predetermined cost function threshold, such as a cost function ranked below the 95th percentile, such as a cost function ranked below the 90th percentile, such as a cost function ranked below the 85th percentile, such as a cost function ranked below the 80th percentile, such as a cost function ranked below the 75th percentile, such as a cost function ranked below the 70th percentile, such as a cost function ranked below the 65th percentile, such as a cost function ranked below the 60th percentile and including discarding the band pass filters having a cost function that is below the 55th percentile. In certain embodiments, methods include determining the median cost function of the bandpass filters. In these embodiments, methods may further include discarding the bandpass filters having a cost function below the median cost function.

In embodiments, methods may include repeating one or more steps of each optimization interval (i.e., mutating, mating, ranking) until an optimal set of bandpass filters have been determined, such as repeating each optimization step N times, where N is 2 or more, such as 3 or more, such as 4 or more, such as 5 or more, such as 10 or more, such as 15 or more, such as 20 or more, such as 25 or more, such as 50 or more, such as 75 or more, such as 100 or more and including where N is 250 or more. In some embodiments, after each interval of optimization the number of photodetectors used to detect the light emanating from the sample may be changed, such as by increasing or decreasing the number of photodetectors used to detect light from the sample. In some embodiments, the number of photodetectors used to detect light from the sample may be increased by 1 or more after an optimization interval, such as by 2 or more, such as by 3 or more, such as by 4 or more, such as by 5 or more and including by 10 or more. In other embodiments, the number of photodetectors used to detect light from the sample may be decreased by 1 or more after an optimization interval, such as by 2 or more, such as by 3 or more, such as by 4 or more, such as by 5 or more and including by 10 or more. Where the number of photodetectors used to detect light from the sample is changed, a cost function for each set of bandpass filters may be recalculated, as described above, and optimization based on the calculated cost function is repeated.

Figure 3:
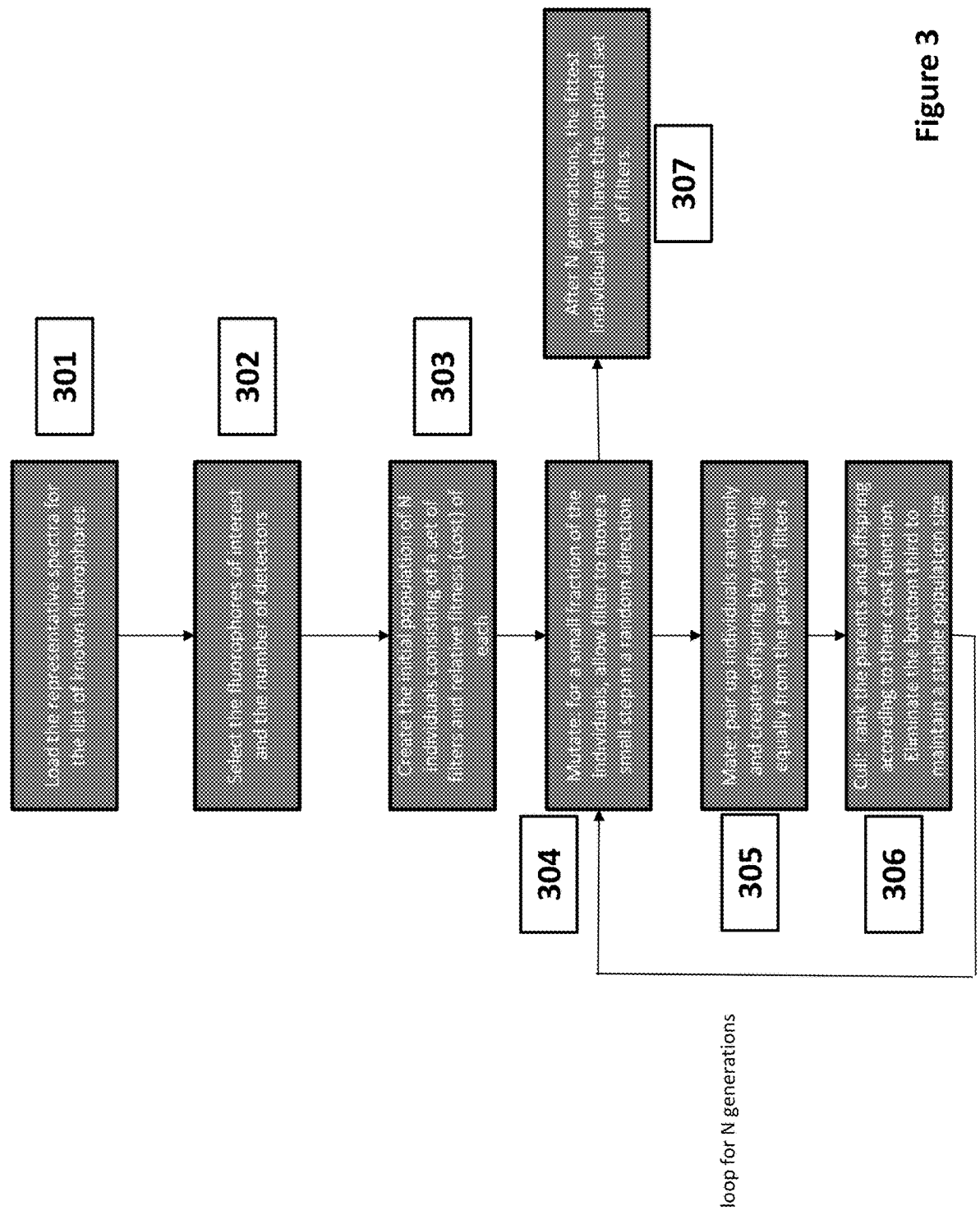
FIG. 3 depicts a flow chart for determining an optimal set of bandpass filters for detecting light from a sample having a plurality of fluorophores according to an embodiment.

FIG. 3 depicts a flow chart for determining an optimal set of bandpass filters for detecting light from a sample having a plurality of fluorophores according to an embodiment. In step 301, spectra for the fluorophores of interest are determined or obtained based on a control sample. The number of fluorophores in the sample and the number of photodetectors employed in the light detection system is selected (step 302). An initial population of bandpass filters is identified and a cost function for each set of bandpass filters is determined (step 303). One or more optimization intervals are conducted (N generations) where the bandpass filters are mutated, mated and ranked (steps 304-306) to determine the optimal set of bandpass filters for measuring light from the sample (step 307).

Figure 4:
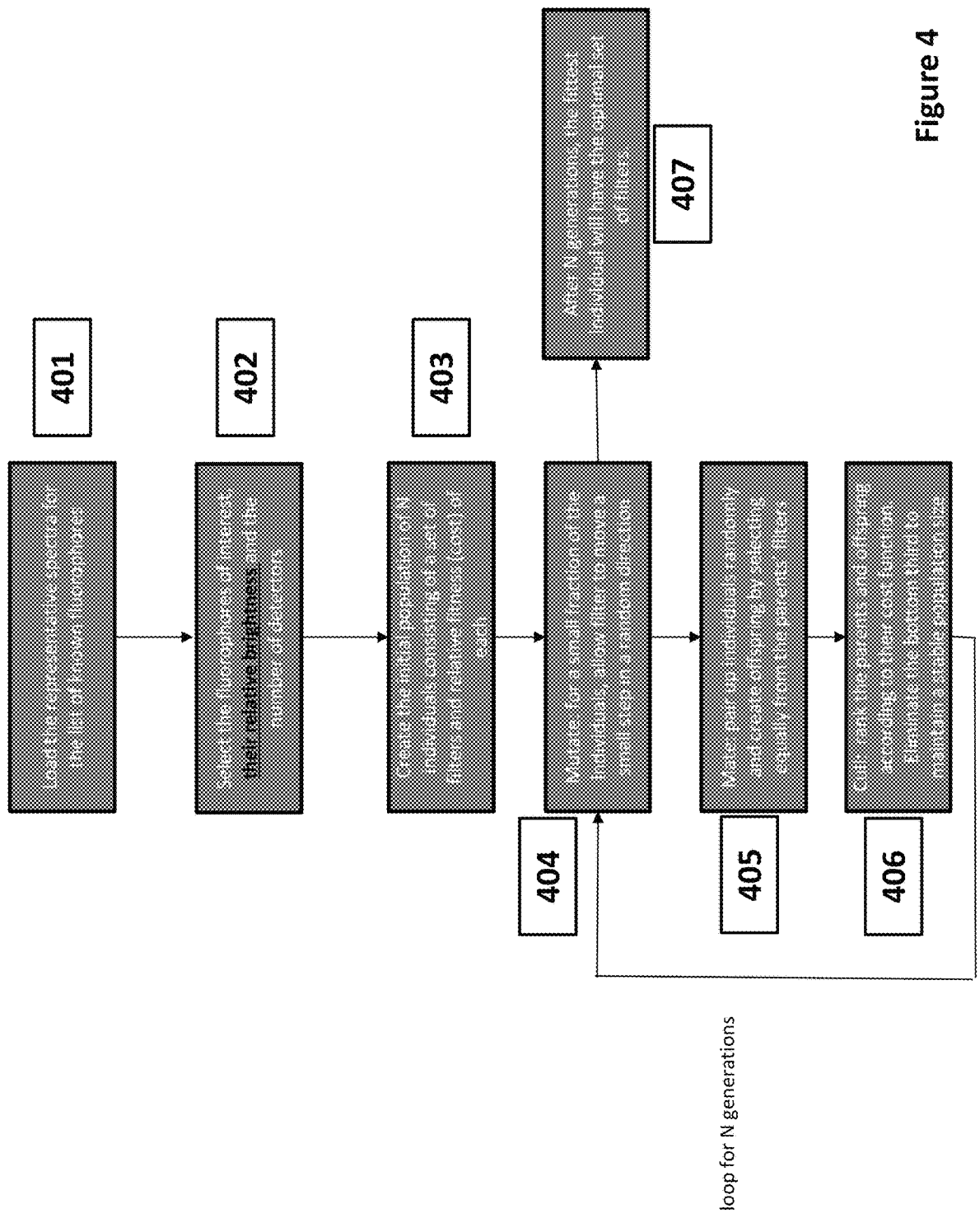
FIG. 4 depicts a flow chart for determining an optimal set of bandpass filters detecting light from a sample having a plurality of fluorophores according to another embodiment.

FIG. 4 depicts a flow chart for determining an optimal set of bandpass filters detecting light from a sample having a plurality of fluorophores according to another embodiment. In step 401, spectra for the fluorophores of interest are determined or obtained based on a control sample. The number of fluorophores in the sample along with the brightness of each fluorophore as well and the number of photodetectors employed in the light detection system is selected (step 402). An initial population of bandpass filters is identified and a cost function for each set of bandpass filters is determined (step 403). One or more optimization intervals are conducted (N generations) where the bandpass filters are mutated, mated and ranked (steps 404-406) to determine the optimal set of bandpass filters for measuring light from the sample (step 407).

Figure 5:
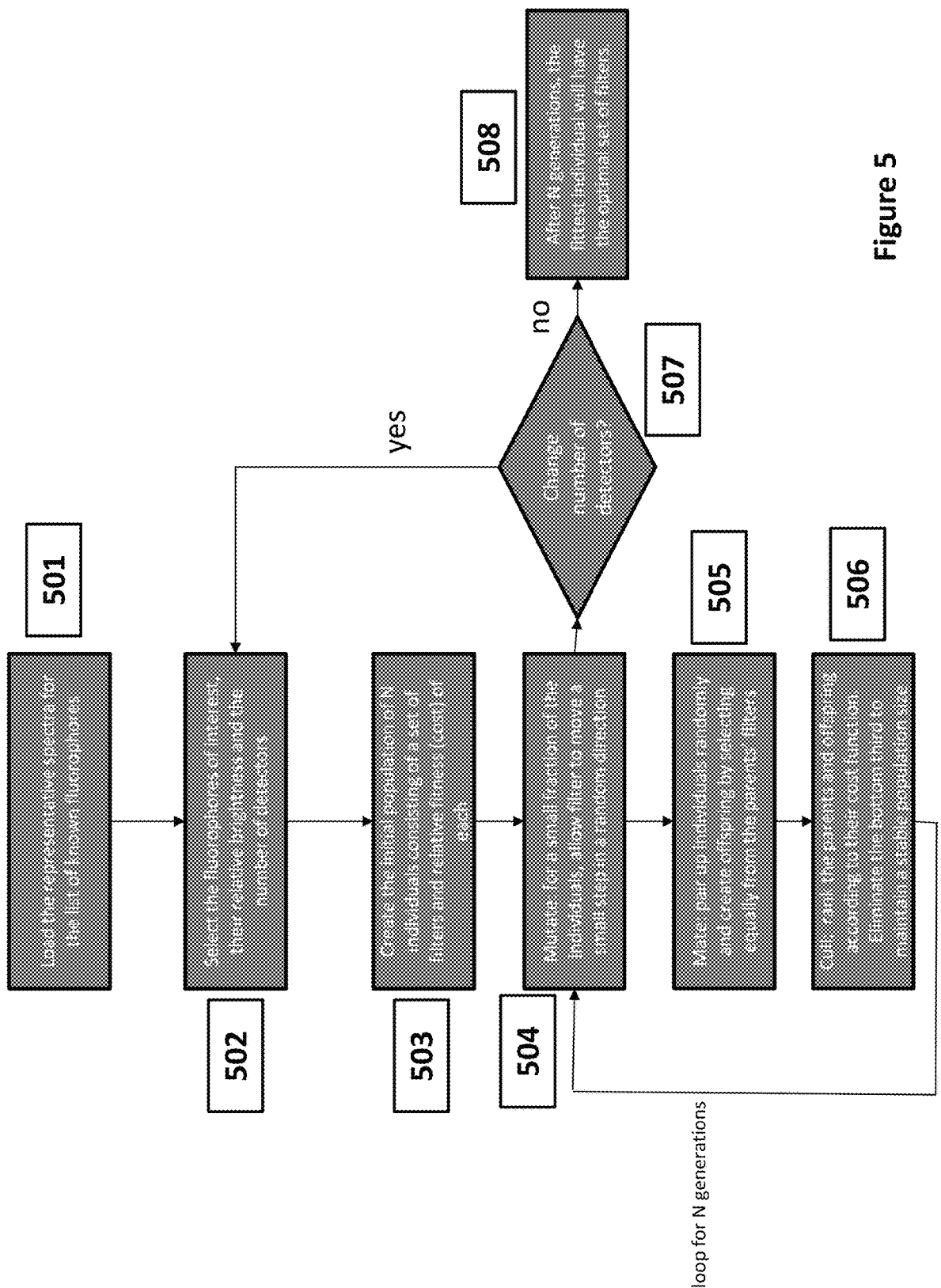
FIG. 5 depicts a flow chart for determining an optimal set of bandpass filters detecting light from a sample having a plurality of fluorophores according to another embodiment.

FIG. 5 depicts a flow chart for determining an optimal set of bandpass filters detecting light from a sample having a plurality of fluorophores according to another embodiment.

In step 501, spectra for the fluorophores of interest are determined or obtained based on a control sample. The number of fluorophores in the sample along with the brightness of each fluorophore as well as the number of photodetectors employed in the light detection system is selected (step 502). An initial population of bandpass filters is identified and a cost function for each set of bandpass filters is determined (step 503). One or more optimization intervals are conducted (N generations) where the bandpass filters are mutated, mated and ranked (steps 504-506). In this embodiment, the number of photodetectors used to detect light from the sample may be changed (e.g., increased or decreased, step 507) and steps 502-506 may be repeated with the modified number of photodetectors. After conducting the desired number of optimization intervals, the optimal set of bandpass filters for measuring light from the sample is determined (step 508).

Computer Controlled Systems

Aspects of the present disclosure further include computer controlled systems for practicing the subject methods, where the systems further include one or more computers for complete automation or partial automation of a system for practicing methods described herein. In some embodiments, systems include a computer having a computer readable storage medium with a computer program stored thereon, where the computer program when loaded on the computer includes instructions for irradiating a flow cell having a sample in a flow stream with a light source and detecting light from the flow cell with a light detection system having a plurality of photodetectors, an amplifier component and an electronic switch component.

In some embodiments, the computer readable storage medium includes algorithm for differentially obscuring one or more wavelengths from the dispersed spectrum of light on the plurality of photodetectors. In some instances, the computer readable storage medium includes algorithm for receiving signals from the plurality of photodetectors with the electronic switch component and differentially propagating the signals from the photodetectors to the amplifier component, such that one or more wavelengths of light detected by the photodetectors are obscured. For example, the computer readable storage medium includes algorithm for differentially propagating signals from one or more of the photodetectors, such as signals from 2 or more of the photodetectors, such as signals from 3 or more of the photodetectors, such as signals from 3 or more of the photodetectors, such as signals from 4 or more of the photodetectors, such as signals from 8 or more of the photodetectors, such as signals from 16 or more of the photodetectors, such as signals from 32 or more of the photodetectors and including differentially propagating signals from 32 or more of the photodetectors. In other instances, the computer readable storage medium includes algorithm for differentially propagating, with the electronic switch component, signals from the photodetectors to the amplifier component, such that one or more wavelength ranges detected by the photodetectors can be obscured, such as 2 or more wavelength ranges, such as 3 or more wavelength ranges, such as 3 or more wavelength ranges, such as 4 or more wavelength ranges, such as 5 or more wavelength ranges, such as 10 or more wavelength ranges and including 25 or more wavelength ranges. In still other embodiments, the computer readable storage medium includes algorithm for differentially detecting a specific portion of the spectral profile of light from the sample by obscuring with the electronic switch component particular wavelengths in the range of 200 nm to 1000 nm.

In certain embodiments, the computer readable storage medium includes algorithm for receiving amplified signals with the electronic switch component from the amplifier component. In these embodiments, the computer readable storage medium includes algorithm for differentially propagating with the electronic switch component the amplified signals from the amplifier component (e.g., having a plurality of transimpedence amplifiers) to a second amplifier component (e.g., having a plurality of summing amplifiers), such that one or more wavelengths of light detected by the photodetectors can be obscured.

In other embodiments, systems include a computer having a computer readable storage medium with a computer program stored thereon, where the computer program when loaded on the computer further includes instructions having one or more of algorithm for determining a cost function for a bandpass filter. In these embodiments, systems include a plurality of photodetectors having a bandpass filter for detecting light emitted from a plurality of fluorophores; and a processor with memory operably coupled to the processor wherein the memory comprises instructions stored thereon, which when executed by the processor, cause the processor to: determine a spillover matrix for the fluorescence spectra of the plurality of fluorophores; and calculate a cost function for detecting the light with the bandpass filter based on the spillover matrix. In certain instances, the memory further includes instructions, which when executed by the processor, cause the processor to assign a number of photoelectrons to each fluorophore and determine how the photoelectrons will be divided between the photodetectors based on the spillover matrix.

In some embodiments, the memory further includes instructions, which when executed by the processor, cause the processor to determine an uncertainty factor associated with each fluorophore. In other embodiments, the memory further includes instructions, which when executed by the processor, cause the processor to determine an uncertainty factor associated with each fluorophore by linear regression. In still other embodiments, the memory further includes instructions, which when executed by the processor, cause the processor to determine an uncertainty factor associated with each fluorophore by an ordinary least squares solution. The memory may also include instructions to add the uncertainty factors associated with the plurality of fluorophores in quadrature. In certain embodiments, the memory further includes instructions, which when executed by the processor, cause the processor to calculate the uncertainty factor according to the equation:

$$\text{Cost Function} = \sum_{i=1}^{n} (dF_i)^2$$

wherein n is the number of fluorophores; and dF is the determined uncertainty associated with each fluorophore. Other equations may be employed, e.g., the fractional error (dFsubi/Fsubi) squared equation.

In other embodiments, systems include a computer having a computer readable storage medium with a computer program stored thereon, where the computer program when loaded on the computer further includes instructions having one or more of algorithm for determining an optimal set of bandpass filters for detecting light from a plurality of fluorophores in a sample. In these embodiments, systems include a plurality of photodetectors having a bandpass filter for detecting light emitted from a plurality of fluorophores and a processor comprising memory operably coupled to the processor wherein the memory comprises instructions stored thereon, which when executed by the processor, cause the processor to: identify a population of different bandpass filters for use in detecting light emitted from the plurality of fluorophores; calculate a cost function for each bandpass filter using a spillover matrix that has spillover coefficients determined from fluorescence spectra of the plurality of fluorophores; and determine an optimal bandpass filter for detecting light from a sample having the plurality of fluorophores with the photodetectors based on the calculated cost function.

In some embodiments, the memory further includes instructions, which when executed by the processor, cause the processor to perform a genetic algorithm to select an optimal set of bandpass filters for detecting light emanating from the sample. In these embodiments, the memory further includes comprises instructions, which when executed by the processor, cause the processor to mutate one or more of the bandpass filters in the identified population to produce a mutated population of bandpass filters, such that the mutated population comprises bandpass filters having wavelengths that are shifted as compared to the bandpass filters of the identified population; and calculate a cost function for each bandpass filter of the mutated population. The mutated population, in some instances, has bandpass filters having wavelengths that are bathochromically or hypsochromically shifted as compared to the bandpass filters of the identified population, such as where the wavelengths are shifted by 1 nm or more.

In embodiments, the memory further includes instructions, which when executed by the processor, cause the processor to mate two or more different bandpass filters from the identified population and the mutated population to produce an offspring population of bandpass filters, such that each offspring bandpass filter comprises wavelengths randomly selected from the mated bandpass filters; and calculate a cost function for each bandpass filter of the offspring population. The memory include algorithm where any number of bandpass filters may be mated from the identified population of bandpass filters and mutated population of bandpass filters, such as 3 or more, such as 4 or more, such as 5 or more, such as 6 or more, such as 8 or more, such as 10 or more and including 20 or more. In these embodiments, any combination of different bandpass filters from each population (e.g., identified population, mutated population) may be combined, such as where one or more bandpass filters from the identified population is mated with one or more of the bandpass filters of the mutated population.

The memory further includes instructions, which when executed by the processor, cause the processor to determine an optimal set of bandpass filters for detecting light from a sample having a plurality of fluorophores, the calculated cost function for each bandpass filter in the identified, mutated and offspring populations are assessed. The memory includes instructions which when executed by the processor, cause the processor to compare the calculated cost function for each bandpass filter in the identified population, mutated population and offspring population; and determine an optimal set of bandpass filters for detecting light from a sample having the plurality of fluorophores. In these embodiments, the memory may include instructions which when executed by the processor cause the processor to discard the bandpass filters having a cost function below a predetermined cost function threshold, such as a cost function ranked below the 95th percentile, such as a cost function ranked below the 90th percentile, such as a cost function ranked below the 85th percentile, such as a cost function ranked below the 80th percentile, such as a cost function ranked below the 75th percentile, such as a cost function ranked below the 70th percentile, such as a cost function ranked below the 65th percentile, such as a cost function ranked below the 60th percentile and including discarding the band pass filters having a cost function that is below the 55th percentile. In certain embodiments, the memory includes instructions which when executed by the processor cause the processor to determine the median cost function of the bandpass filters and discard the bandpass filters having a cost function below the median cost function.

Systems may include a display and operator input device. Operator input devices may, for example, be a keyboard, mouse, or the like. The processing module includes a processor which has access to a memory having instructions stored thereon for performing the steps of the subject methods. The processing module may include an operating system, a graphical user interface (GUI) controller, a system memory, memory storage devices, and input-output controllers, cache memory, a data backup unit, and many other devices. The processor may be a commercially available processor or it may be one of other processors that are or will become available. The processor executes the operating system and the operating system interfaces with firmware and hardware in a well-known manner, and facilitates the processor in coordinating and executing the functions of various computer programs that may be written in a variety of programming languages, such as Java, Perl, C++, other high level or low level languages, as well as combinations thereof, as is known in the art. The operating system, typically in cooperation with the processor, coordinates and executes functions of the other components of the computer. The operating system also provides scheduling, input-output control, file and data management, memory management, and communication control and related services, all in accordance with known techniques. The processor may be any suitable analog or digital system. In some embodiments, the processor includes analog electronics which provide feedback control, such as for example negative feedback control.

The system memory may be any of a variety of known or future memory storage devices. Examples include any commonly available random access memory (RAM), magnetic medium such as a resident hard disk or tape, an optical medium such as a read and write compact disc, flash memory devices, or other memory storage device. The memory storage device may be any of a variety of known or future devices, including a compact disk drive, a tape drive, a removable hard disk drive, or a diskette drive. Such types of memory storage devices typically read from, and/or write to, a program storage medium (not shown) such as, respectively, a compact disk, magnetic tape, removable hard disk, or floppy diskette. Any of these program storage media, or others now in use or that may later be developed, may be considered a computer program product. As will be appreciated, these program storage media typically store a computer software program and/or data. Computer software programs, also called computer control logic, typically are stored in system memory and/or the program storage device used in conjunction with the memory storage device.

In some embodiments, a computer program product is described comprising a computer usable medium having control logic (computer software program, including program code) stored therein. The control logic, when executed by the processor the computer, causes the processor to perform functions described herein. In other embodiments, some functions are implemented primarily in hardware using, for example, a hardware state machine. Implementation of the hardware state machine so as to perform the functions described herein will be apparent to those skilled in the relevant arts.

Memory may be any suitable device in which the processor can store and retrieve data, such as magnetic, optical, or solid state storage devices (including magnetic or optical disks or tape or RAM, or any other suitable device, either fixed or portable). The processor may include a general purpose digital microprocessor suitably programmed from a computer readable medium carrying necessary program code. Programming can be provided remotely to processor through a communication channel, or previously saved in a computer program product such as memory or some other portable or fixed computer readable storage medium using any of those devices in connection with memory. For example, a magnetic or optical disk may carry the programming, and can be read by a disk writer/reader. Systems of the invention also include programming, e.g., in the form of computer program products, algorithms for use in practicing the methods as described above. Programming according to the present invention can be recorded on computer readable media, e.g., any medium that can be read and accessed directly by a computer. Such media include, but are not limited to: magnetic storage media, such as floppy discs, hard disc storage medium, and magnetic tape; optical storage media such as CD-ROM; electrical storage media such as RAM and ROM; portable flash drive; and hybrids of these categories such as magnetic/optical storage media.

The processor may also have access to a communication channel to communicate with a user at a remote location. By remote location is meant the user is not directly in contact with the system and relays input information to an input manager from an external device, such as a a computer connected to a Wide Area Network ("WAN"), telephone network, satellite network, or any other suitable communication channel, including a mobile telephone (i.e., smartphone).

In some embodiments, systems according to the present disclosure may be configured to include a communication interface. In some embodiments, the communication interface includes a receiver and/or transmitter for communicating with a network and/or another device. The communication interface can be configured for wired or wireless communication, including, but not limited to, radio frequency (RF) communication (e.g., Radio-Frequency Identification (RFID), Zigbee communication protocols, WiFi, infrared, wireless Universal Serial Bus (USB), Ultra Wide Band (UWB), Bluetooth® communication protocols, and cellular communication, such as code division multiple access (CDMA) or Global System for Mobile communications (GSM).

In one embodiment, the communication interface is configured to include one or more communication ports, e.g., physical ports or interfaces such as a USB port, an RS-232 port, or any other suitable electrical connection port to allow data communication between the subject systems and other external devices such as a computer terminal (for example, at a physician's office or in hospital environment) that is configured for similar complementary data communication.

In one embodiment, the communication interface is configured for infrared communication, Bluetooth® communication, or any other suitable wireless communication protocol to enable the subject systems to communicate with other devices such as computer terminals and/or networks, communication enabled mobile telephones, personal digital assistants, or any other communication devices which the user may use in conjunction.

In one embodiment, the communication interface is configured to provide a connection for data transfer utilizing Internet Protocol (IP) through a cell phone network, Short Message Service (SMS), wireless connection to a personal computer (PC) on a Local Area Network (LAN) which is connected to the internet, or WiFi connection to the internet at a WiFi hotspot.

In one embodiment, the subject systems are configured to wirelessly communicate with a server device via the communication interface, e.g., using a common standard such as 802.11 or Bluetooth® RF protocol, or an IrDA infrared protocol. The server device may be another portable device, such as a smart phone, Personal Digital Assistant (PDA) or notebook computer; or a larger device such as a desktop computer, appliance, etc. In some embodiments, the server device has a display, such as a liquid crystal display (LCD), as well as an input device, such as buttons, a keyboard, mouse or touch-screen.

In some embodiments, the communication interface is configured to automatically or semi-automatically communicate data stored in the subject systems, e.g., in an optional data storage unit, with a network or server device using one or more of the communication protocols and/or mechanisms described above.

Output controllers may include controllers for any of a variety of known display devices for presenting information to a user, whether a human or a machine, whether local or remote. If one of the display devices provides visual information, this information typically may be logically and/or physically organized as an array of picture elements. A graphical user interface (GUI) controller may include any of a variety of known or future software programs for providing graphical input and output interfaces between the system and a user, and for processing user inputs. The functional elements of the computer may communicate with each other via system bus. Some of these communications may be accomplished in alternative embodiments using network or other types of remote communications. The output manager may also provide information generated by the processing module to a user at a remote location, e.g., over the Internet, phone or satellite network, in accordance with known techniques. The presentation of data by the output manager may be implemented in accordance with a variety of known techniques. As some examples, data may include SQL, HTML or XML documents, email or other files, or data in other forms. The data may include Internet URL addresses so that a user may retrieve additional SQL, HTML, XML, or other documents or data from remote sources. The one or more platforms present in the subject systems may be any type of known computer platform or a type to be developed in the future, although they typically will be of a class of computer commonly referred to as servers. However, they may also be a main-frame computer, a work station, or other computer type. They may be connected via any known or future type of cabling or other communication system including wireless systems, either networked or otherwise. They may be co-located or they may be physically separated. Various operating systems may be employed on any of the computer platforms, possibly depending on the type and/or make of computer platform chosen. Appropriate operating systems include Windows 10, Windows NT®, Windows XP, Windows 7, Windows 8, iOS, Sun Solaris, Linux, OS/400, Compaq Tru64 Unix, SGI IRIX, Siemens Reliant Unix, Ubuntu, Zorin OS and others.

Kits

Aspects of the invention further include kits, where kits include include one or more photodetector arrays, each photodetector array having two or more photodetectors, an amplifier component having a plurality of amplifiers and an electronic switch component. In embodiments, the electronic switch component is configured to be electrically coupled to the plurality of photodetectors of the photodetector array and plurality of amplifiers. In some embodiments, kits further include a light dispersion component, such as a prism, diffraction grating, monochromator or other type of light dispersion component. Kits may also include one or more optical adjustment components (e.g., beam splitter, collimating lenses, mirrors, wavelength separators, pinholes, etc.) for positioning in an optical path between each photodetector array. In certain instances, kits also include an optical collection component, such as fiber optics (e.g., fiber optics relay bundle) or components for a free-space relay system.

In some embodiments, the kits can include one or more assay components (e.g., labeled reagents, buffers, etc., such as described above). In some instances, the kits may further include a sample collection device, e.g., a lance or needle configured to prick skin to obtain a whole blood sample, a pipette, etc., as desired.

The various assay components of the kits may be present in separate containers, or some or all of them may be pre-combined. For example, in some instances, one or more components of the kit, e.g., the connectors, orifice plates are present in a sealed pouch, e.g., a sterile foil pouch or envelope.

In addition to the above components, the subject kits may further include (in certain embodiments) instructions for practicing the subject methods. These instructions may be present in the subject kits in a variety of forms, one or more of which may be present in the kit. One form in which these instructions may be present is as printed information on a suitable medium or substrate, e.g., a piece or pieces of paper on which the information is printed, in the packaging of the kit, in a package insert, and the like. Yet another form of these instructions is a computer readable medium, e.g., diskette, compact disk (CD), portable flash drive, and the like, on which the information has been recorded. Yet another form of these instructions that may be present is a website address which may be used via the internet to access the information at a removed site.

Utility

The subject light detection systems find use where the characterization of a sample by optical properties, in particular where low levels of light are collected or a plurality of fluorophores are present in the sample, is desired. In some embodiments, the systems and methods described herein find use in flow cytometry characterization of biological samples labelled with fluorescent tags. In other embodiments, the systems and methods find use in spectroscopy of transmitted, emitted or scattered light. In addition, the subject systems and methods find use in increasing the obtainable signal from light collected from a sample (e.g., in a flow stream). In certain instances, the present disclosure finds use in enhancing measurement of light collected from a sample that is irradiated in a flow stream in a flow cytometer. Embodiments of the present disclosure find use where enhancing the effectiveness of emission measurements in flow cytometry are desired, such as in research and high throughput laboratory testing. The present disclosure also finds use where it is desirable to provide a flow cytometer with improved cell sorting accuracy, enhanced particle collection, reduced energy consumption, particle charging efficiency, more accurate particle charging and enhanced particle deflection during cell sorting.

The present disclosure also finds use in applications where cells prepared from a biological sample may be desired for research, laboratory testing or for use in therapy. In some embodiments, the subject methods and devices may facilitate the obtaining individual cells prepared from a target fluidic or tissue biological sample. For example, the subject methods and systems facilitate obtaining cells from fluidic or tissue samples to be used as a research or diagnostic specimen for diseases such as cancer. Likewise, the subject methods and systems facilitate obtaining cells from fluidic or tissue samples to be used in therapy. Methods and devices of the present disclosure allow for separating and collecting cells from a biological sample (e.g., organ, tissue, tissue fragment, fluid) with enhanced efficiency and low cost as compared to traditional flow cytometry systems.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. Moreover, nothing disclosed herein is intended to be dedicated to the public regardless of whether such disclosure is explicitly recited in the claims.

The scope of the present invention, therefore, is not intended to be limited to the exemplary embodiments shown and described herein. Rather, the scope and spirit of present invention is embodied by the appended claims. In the claims, 35 U.S.C. § 112(f) or 35 U.S.C. § 112(6) is expressly defined as being invoked for a limitation in the claim only when the exact phrase "means for" or the exact phrase "step for" is recited at the beginning of such limitation in the claim; if such exact phrase is not used in a limitation in the claim, then 35 U.S.C. § 112 (f) or 35 U.S.C. § 112(6) is not invoked.

What is claimed is:

1. A light detection system comprising:
a plurality of photodetectors;
an amplifier component; and
an electronic switch component comprising a plurality of switches in electrical communication with the plurality of photodetectors and the amplifier component, wherein the electronic switch component is configured to differentially obscure light received from the plurality of photodetectors by deactivating a subset of switches in the plurality of switches and thereby not generating an electronic signal corresponding to the received light.

2. The light detection system according to claim 1, wherein the amplifier component comprises a plurality of amplifiers.

3. The light detection system according to claim 2, wherein the system comprises:
- a photodetector array comprising N photodetectors;
- an amplifier component comprising N amplifiers; and
- an electronic switch component comprising an array of N×N switches, wherein N is an integer from 4 to 1000.

4. The light detection system according to claim 2, wherein the system comprises:
- a photodetector array comprising N photodetectors;
- an amplifier component comprising 2N amplifiers; and
- an electronic switch component comprising an array of N×N switches, wherein N is an integer from 4 to 1000.

5. The light detection system according to claim 4, wherein the amplifier component comprises N transimpedence amplifiers and N summing amplifiers.

6. The light detection system according to claim 5, wherein the transimpedence amplifiers are electrically positioned between the photodetector array and the electronic switch component.

7. The light detection system according to claim 6, wherein the electronic switch component is configured to multiplex or de-multiplex signals from the transimpedence amplifiers.

8. The light detection system according to claim 7, wherein the summing amplifiers are configured to receive multiplexed or de-multiplexed output signals from the electronic switch component.

9. The light detection system according to claim 1, wherein the electronic switch component is configured to multiplex or de-multiplex output signals from the photodetectors.

10. The light detection system according to claim 1, wherein the amplifier component is configured to receive multiplexed or de-multiplexed output signals from the electronic switch component.

11. The light detection system according to claim 1, wherein the amplifier component comprises one or more transimpedence amplifiers.

12. The light detection system according to claim 11, wherein the amplifier component comprises one or more summing amplifiers.

13. The light detection system according to claim 1, wherein the photodetectors comprise one or more photodiodes.

14. The light detection system according to claim 1, wherein the light detection system is a flow cytometer.

15. A method of differentially detecting light, the method comprising:
- detecting light with a plurality of photodetectors;
- amplifying the detected light with an amplifier component; and
- differentially obscuring the detected light with an electronic switch component comprising a plurality of switches by deactivating a subset of switches in the plurality of switches and thereby not generating an electronic signal corresponding to the detected light.

16. The method according to claim 15, further comprising deactivating a subset of switches in the plurality of switches to differentially detect different wavelengths of light.

17. The method according to claim 15, wherein the amplifier component comprises a plurality of amplifiers.

18. The method according to claim 15, wherein:
- the plurality of photodetectors comprises a photodetector array comprising N photodetectors;
- the amplifier component comprises N amplifiers; and
- the electronic switch component comprises an array of N×N switches, wherein N is an integer from 4 to 1000.

19. The method according to claim 15, further comprising multiplexing or de-multiplexing output signals from the photodetectors.

20. The method according to claim 15, further comprising multiplexing or de-multiplexing signals from the amplifier component.

* * * * *